(12) United States Patent
Jaros et al.

(10) Patent No.: US 8,504,494 B2
(45) Date of Patent: *Aug. 6, 2013

(54) SPATIO-TEMPORAL LEARNING ALGORITHMS IN HIERARCHICAL TEMPORAL NETWORKS

(75) Inventors: Robert G. Jaros, San Francisco, CA (US); Jeffrey L. Edwards, Menlo Park, CA (US); Dileep George, Menlo Park, CA (US); Jeffrey C. Hawkins, Atherton, CA (US)

(73) Assignee: Numenta, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/227,355

(22) Filed: Sep. 7, 2011

(65) Prior Publication Data

US 2012/0005134 A1   Jan. 5, 2012

Related U.S. Application Data

(63) Continuation of application No. 12/039,630, filed on Feb. 28, 2008, now Pat. No. 8,037,010.

(60) Provisional application No. 60/904,634, filed on Feb. 28, 2007.

(51) Int. Cl.
| | | |
|---|---|---|
| *G06F 15/18* | (2006.01) | |
| *G06F 9/44* | (2006.01) | |
| *G06N 7/02* | (2006.01) | |
| *G06N 7/06* | (2006.01) | |

(52) U.S. Cl.
USPC ............................................. 706/12; 706/52

(58) Field of Classification Search
None
See application file for complete search history.

(56) References Cited

U.S. PATENT DOCUMENTS

| | | | |
|---|---|---|---|
| 4,766,534 | A | 8/1988 | DeBenedictis |
| 4,845,744 | A | 7/1989 | DeBenedictis |
| 5,255,348 | A | 10/1993 | Nenov |
| 5,712,953 | A | 1/1998 | Langs |
| 5,729,661 | A | 3/1998 | Keeler et al. |
| 5,761,389 | A | 6/1998 | Maeda et al. |
| 6,028,608 | A | 2/2000 | Jenkins |
| 6,122,014 | A | 9/2000 | Panusopone et al. |

(Continued)

FOREIGN PATENT DOCUMENTS

| | | |
|---|---|---|
| EP | 1 557 990 | 7/2005 |
| WO | WO 2006/063291 | 6/2006 |
| WO | WO 2008/067326 | 6/2008 |
| WO | WO 2009/006231 | 1/2009 |

OTHER PUBLICATIONS

Hawkins et al., "Hierarchical Temporal Memory, Concepts, Theory, and Terminology", Numenta, 2006, pp. 1-19.*

(Continued)

*Primary Examiner* — Kakali Chaki
*Assistant Examiner* — Daniel Pellett
(74) *Attorney, Agent, or Firm* — Fenwick & West LLP

(57) ABSTRACT

A spatio-temporal learning node is a type of HTM node which learns both spatial and temporal groups of sensed input patterns over time. Spatio-temporal learning nodes comprise spatial poolers which are used to determine spatial groups in a set of sensed input patterns. The spatio-temporal learning nodes further comprise temporal poolers which are used to determine groups of sensed input patterns that temporally co-occur. A spatio-temporal learning network is a hierarchical network including a plurality of spatio-temporal learning nodes.

20 Claims, 19 Drawing Sheets

U.S. PATENT DOCUMENTS

| | | | |
|---|---|---|---|
| 6,144,711 A * | 11/2000 | Raleigh et al. | 375/347 |
| 6,195,622 B1 | 2/2001 | Altschuler et al. | |
| 6,400,996 B1 | 6/2002 | Hoffberg et al. | |
| 6,468,069 B2 | 10/2002 | Lemelson et al. | |
| 6,567,814 B1 | 5/2003 | Banker et al. | |
| 6,615,211 B2 | 9/2003 | Beygelzimer et al. | |
| 6,625,585 B1 | 9/2003 | MacCuish et al. | |
| 6,714,941 B1 | 3/2004 | Lerman et al. | |
| 6,751,343 B1 | 6/2004 | Ferrell et al. | |
| 6,957,241 B2 | 10/2005 | George | |
| 7,088,693 B2 | 8/2006 | George | |
| 7,251,637 B1 | 7/2007 | Caid et al. | |
| 7,613,675 B2 | 11/2009 | Hawkins et al. | |
| 7,620,608 B2 | 11/2009 | Jaros et al. | |
| 7,624,085 B2 | 11/2009 | Hawkins | |
| 7,676,458 B2 | 3/2010 | Aggarwal et al. | |
| 7,739,208 B2 | 6/2010 | George | |
| 7,826,990 B2 | 11/2010 | Nasle et al. | |
| 7,840,395 B2 | 11/2010 | Nasle et al. | |
| 7,840,396 B2 | 11/2010 | Radibratovic et al. | |
| 7,844,439 B2 | 11/2010 | Nasle et al. | |
| 7,844,440 B2 | 11/2010 | Nasle et al. | |
| 7,899,775 B2 | 3/2011 | George | |
| 7,904,412 B2 | 3/2011 | Saphir et al. | |
| 7,937,342 B2 | 5/2011 | George et al. | |
| 7,941,389 B2 | 5/2011 | Marianetti et al. | |
| 7,941,392 B2 | 5/2011 | Saphir | |
| 7,983,998 B2 | 7/2011 | George et al. | |
| 8,037,010 B2 | 10/2011 | Jaros et al. | |
| 8,103,603 B2 | 1/2012 | George et al. | |
| 8,112,367 B2 | 2/2012 | George et al. | |
| 8,121,961 B2 | 2/2012 | George et al. | |
| 8,175,981 B2 | 5/2012 | Hawkins et al. | |
| 8,175,984 B2 | 5/2012 | George | |
| 8,175,985 B2 | 5/2012 | Sayfan et al. | |
| 8,195,582 B2 | 6/2012 | Niemasik et al. | |
| 8,219,507 B2 | 7/2012 | Jaros et al. | |
| 8,285,667 B2 | 10/2012 | Jaros et al. | |
| 8,290,886 B2 | 10/2012 | George et al. | |
| 2002/0002688 A1 | 1/2002 | Gregg et al. | |
| 2002/0038294 A1 | 3/2002 | Matsugu | |
| 2002/0150044 A1 | 10/2002 | Wu et al. | |
| 2002/0161736 A1 | 10/2002 | Beygelzimer et al. | |
| 2003/0069002 A1 | 4/2003 | Hunter et al. | |
| 2003/0105597 A1 | 6/2003 | Tsui et al. | |
| 2003/0123732 A1 | 7/2003 | Miyazaki et al. | |
| 2003/0167111 A1 | 9/2003 | Kipersztok et al. | |
| 2004/0002838 A1 | 1/2004 | Oliver et al. | |
| 2004/0015459 A1 | 1/2004 | Jaeger | |
| 2004/0142325 A1 | 7/2004 | Mintz et al. | |
| 2004/0148520 A1 | 7/2004 | Talpade et al. | |
| 2004/0267395 A1 | 12/2004 | Discenzo et al. | |
| 2005/0002572 A1 * | 1/2005 | Saptharishi et al. | 382/224 |
| 2005/0028033 A1 | 2/2005 | Kipersztok et al. | |
| 2005/0063565 A1 | 3/2005 | Nagaoka et al. | |
| 2005/0190990 A1 | 9/2005 | Burt et al. | |
| 2005/0203773 A1 | 9/2005 | Soto et al. | |
| 2005/0222811 A1 | 10/2005 | Jakobson et al. | |
| 2006/0093188 A1 * | 5/2006 | Blake et al. | 382/103 |
| 2006/0098886 A1 | 5/2006 | De Haan | |
| 2006/0161736 A1 | 7/2006 | Huang | |
| 2006/0184462 A1 | 8/2006 | Hawkins | |
| 2006/0212444 A1 | 9/2006 | Handman et al. | |
| 2006/0235320 A1 | 10/2006 | Tan et al. | |
| 2006/0248026 A1 | 11/2006 | Aoyama et al. | |
| 2006/0248073 A1 | 11/2006 | Jones et al. | |
| 2006/0253491 A1 | 11/2006 | Gokturk et al. | |
| 2006/0259163 A1 | 11/2006 | Hsiung et al. | |
| 2007/0005531 A1 * | 1/2007 | George et al. | 706/16 |
| 2007/0019754 A1 * | 1/2007 | Raleigh et al. | 375/260 |
| 2007/0192264 A1 | 8/2007 | Hawkins et al. | |
| 2007/0192267 A1 | 8/2007 | Hawkins et al. | |
| 2007/0192268 A1 | 8/2007 | Hawkins et al. | |
| 2007/0192269 A1 | 8/2007 | Saphir et al. | |
| 2007/0192270 A1 | 8/2007 | Hawkins et al. | |
| 2007/0228703 A1 | 10/2007 | Breed | |
| 2007/0276744 A1 | 11/2007 | Burke | |
| 2007/0276774 A1 * | 11/2007 | Ahmad et al. | 706/12 |
| 2008/0059389 A1 | 3/2008 | Jaros et al. | |
| 2008/0140593 A1 | 6/2008 | George et al. | |
| 2008/0183647 A1 | 7/2008 | Hawkins et al. | |
| 2008/0201286 A1 | 8/2008 | Hawkins et al. | |
| 2008/0208783 A1 | 8/2008 | Jaros et al. | |
| 2008/0208915 A1 | 8/2008 | George et al. | |
| 2008/0208966 A1 | 8/2008 | Edwards et al. | |
| 2009/0006289 A1 | 1/2009 | Jaros et al. | |
| 2009/0116413 A1 | 5/2009 | George | |
| 2009/0150311 A1 | 6/2009 | George | |
| 2009/0240886 A1 | 9/2009 | Sayfan et al. | |
| 2009/0313193 A1 | 12/2009 | Hawkins et al. | |
| 2010/0049677 A1 | 2/2010 | Jaros et al. | |
| 2010/0185567 A1 | 7/2010 | Niemasik et al. | |
| 2010/0191684 A1 | 7/2010 | George et al. | |
| 2010/0207754 A1 | 8/2010 | Shostak et al. | |
| 2011/0225108 A1 | 9/2011 | Hawkins et al. | |
| 2011/0231351 A1 | 9/2011 | George et al. | |
| 2012/0166364 A1 | 6/2012 | Ahmad et al. | |
| 2012/0197823 A1 | 8/2012 | Hawkins et al. | |

OTHER PUBLICATIONS

Rojas, "Neural Networks, A systematic Approach", Springer-Verlag, 1996, pp. 20-21, 110-112 and 31-319.*

U.S. Appl. No. 13/218,170, filed Aug. 25, 2011.

U.S. Appl. No. 13/218,194, filed Aug. 25, 2011.

U.S. Appl. No. 13/218,202, filed Aug. 25, 2011.

U.S. Appl. No. 13/333,865, filed Dec. 21, 2011.

U.S. Appl. No. 13/415,713, filed Mar. 8, 2012.

Ahmad, S. et al., "PowerNuPIC," Numenta, Jun. 2008, Numenta HTM Workshop, Jun. 23-24, 2008, SRI Campus, Menlo Park, CA, USA, fifty-six pages.

Ahmad, S., "NuPIC Jumpstart—Part II," May 2008, Numenta HTM Workshop, Jun. 23-24, 2008, SRI Campus, Menlo Park, CA, USA, thirty-three pages.

Biancaniello, P. et al., "Lockheed Martin Brain-Inspired Computing Research Overview; Multimodal Pattern Recognition with Hierarchical Temporal Memory (MPR)," Numenta HTM Workshop, Jun. 2008, twelve pages.

Bobier, B., "Content-Based Image Retrieval Using Hierarchical Temporal Memory," Numenta HTM Workshop, Jun. 23-24, 2008, SRI Campus, Menlo Park, CA, seven pages.

Bryhni et al., "A Comparison of Load Balancing Techniques for Scalable Web Servers," *IEEE Network*, Jul./Aug. 2000, pp. 58-64.

China State Intellectual Property Office, First Office Action, Chinese Patent Application No. 200780007274.1, Jun. 24, 2011, five pages.

China State Intellectual Property Office, First Office Action, Chinese Patent Application No. 200580042258.7, Jul. 10, 2009, twelve pages.

Cormack, G.V. et al., "Data Compression Using Dynamic Markov Modelling," *The Computer Journal*, 1987, pp. 541-550, vol. 30, No. 6.

Curry, C. et al., "Speech Processing with HTM," Numenta Jun. 2008, Numenta HTM Workshop, Jun. 23-24, 2008, SRI Campus, Menlo Park, CA, fifty-seven pages.

Dean, T., "Learning Invariant Features Using Inertial Priors," *Annals of Mathematics and Artificial Intelligence*, 2006, pp. 223-250, vol. 47.

Dubinsky, D., "Numenta Business Strategy," Numenta, Jun. 2008, Numenta HTM Workshop, Jun. 23-24, 2008, SRI Campus, Menlo Park, CA, fifteen pages.

Edsa, "Project Information," Apr. 2008, Numenta HTM Workshop, Jun. 23-24, 2008, SRI Campus, Menlo Park, CA, four pages.

Eswaran, K., "Numenta Lightning Talk on Dimension Reduction and Unsupervised Learning," Numenta HTM Workshop, Jun. 23-24, 2008, SRI Campus, Menlo Park, CA, thirty pages.

Finley, M., "Exploration of Motion Capture," Qualia Labs, Jun. 24, 2008, Numenta HTM Workshop, Jun. 23-24, 2008, SRI Campus, Menlo Park, CA, thirty-six pages.

Haitani, R. et al., "Vitamin D Toolkit, Introduction," Jun. 24, 2008, Numenta HTM Workshop, Jun. 23-24, 2008, SRI Campus, Menlo Park, CA, USA, eleven pages.

Hawkins, J. et al., "Sequence Memory for Prediction, Inference and Behaviour," *Philosophical Transactions of The Royal Society B*, Mar. 31, 2009, pp. 1203-1209, vol. 364.

Levinson, S. et al., "Automatic Language Acquisition for a Mobile Robot," Feb. 2005, Numenta HTM Workshop, Jun. 23-24, 2008, SRI Campus, Menlo Park, CA, twenty-seven pages.
McDowell, C. et al., "SlugGo, a Computer Go Program," Numenta HTM Workshop, Jun. 23-24, 2008, SRI Campus, Menlo Park, CA, eighteen pages.
Mitrovic, A., "An Intelligent SQL Tutor on the Web," *International Journal of Artificial Intelligence in Education*, 2003, pp. 171-195, vol. 13.
Nair, D. et al., "Bayesian Recognition of Targets by Parts in Second Generation Forward Looking Infrared Images," *Image and Vision Computing*, 2000, pp. 849-864, vol. 18.
Numenta, Inc., "HTM Algorithms," Jun. 2008, Numenta HTM Workshop, Jun. 23-24, 2008, SRI Campus, Menlo Park, CA, sixty-seven pages.
Numenta, Inc., "HTM Workshop, Jumpstart," Jun. 2008, Numenta HTM Workshop, Jun. 23-24, 2008, SRI Campus, Menlo Park, CA, eighty-six pages.
Numenta, Inc., "Problem Solving with HTMs," Jun. 2008, Numenta HTM Workshop, Jun. 23-24, 2008, SRI Campus, Menlo Park, CA, twenty-three pages.
Numenta, Inc., "Vision Framework," Jun. 2008, Numenta HTM Workshop, Jun. 23-24, 2008, SRI Campus, Menlo Park, CA, thirty-six pages.
Park, S. et al., "Recognition of Two-person Interactions Using a Hierarchical Bayesian Network," *ACM SIGMM International Workshop on Video Surveillance (IWVS) 2003*, pp. 65-76, Berkeley, USA.
PCT International Search Report and Written Opinion, PCT Application No. PCT/US2008/080347, Dec. 10, 2008, six pages.
PCT International Search Report and Written Opinion, PCT Application No. PCT/US2005/044729, May 14, 2007, twelve pages.
Rao, R. et al., "Predictive Coding in the Visual Cortex: A Functional Interpretation of Some Extra-classical Receptive-field Effects," *Nature Neuroscience*, Jan. 1999, pp. 79-87, vol. 2, No. 1.
Riesenhuber, M. et al., "Hierarchical Models of Object Recognition in Cortex," *Nature Neuroscience*, Nov. 1999, pp. 1019-1025, vol. 2, No. 11.
Ross, L., "Discovering and Using Patterns in Plant Floor Data," Numenta HTM Workshop, Jun. 23-24, 2008, SRI Campus, Menlo Park, CA, twelve pages.
Saphir, B., "Power NuPIC Part II, How to Create a New Node Type," Numenta, Jun. 2008, Numenta HTM Workshop, Jun. 23-24, 2008, SRI Campus, Menlo Park, CA, thirty-two pages.
SDSYSTEM24.Com, "HTM Optimized Drug Therapy," Numenta HTM Workshop, Jun. 23-24, 2008, SRI Campus, Menlo Park, CA, seven pages.
United Stated Office Action, U.S. Appl. No. 11/010,243, Jul. 12, 2007, twelve pages.
United Stated Office Action, U.S. Appl. No. 11/351,437, Aug. 23, 2007, sixteen pages.
United Stated Office Action, U.S. Appl. No. 11/351,437, Feb. 20, 2008, six pages.
United Stated Office Action, U.S. Appl. No. 11/622,447, May 28, 2008, eighteen pages.
United Stated Office Action, U.S. Appl. No. 11/622,448, Aug. 24, 2007, nineteen pages.
United Stated Office Action, U.S. Appl. No. 11/622,448, Apr. 30, 2008, seventeen pages.
United Stated Office Action, U.S. Appl. No. 11/680,197, Sep. 14, 2010, seventeen pages.
United Stated Office Action, U.S. Appl. No. 11/945,919, Sep. 7, 2010, nineteen pages.
United Stated Office Action, U.S. Appl. No. 12/029,434, Mar. 28, 2011, twenty-four pages.
United Stated Office Action, U.S. Appl. No. 12/039,630, Nov. 24, 2010, ten pages.
United Stated Office Action, U.S. Appl. No. 12/040,849, Feb. 3, 2011, thirteen pages.
United Stated Office Action, U.S. Appl. No. 12/040,849, Jul. 1, 2011, eighteen pages.
United Stated Office Action, U.S. Appl. No. 12/147,348, Oct. 11, 2011, forty-three pages.
United Stated Office Action, U.S. Appl. No. 12/288,185, Sep. 15, 2010, eleven pages.
United Stated Office Action, U.S. Appl. No. 12/751,808, Oct. 28, 2010, thirteen pages.
United Stated Office Action, U.S. Appl. No. 13/151,928, Aug. 2, 2011, eight pages.
Vaught, T.N., "Software Design in Scientific Computing," Jun. 23, 2008, Numenta HTM Workshop, Jun. 23-24, 2008, SRI Campus, Menlo Park, CA, thirty-two pages.
Numenta, Inc., "Zeta1 Algorithms Reference, Version 1.0," Mar. 1, 2007, thirty-seven pages.
George, D. et al., "Invariant Pattern Recognition Using Bayesian Inference on Hierarchical Sequences," Stanford, Oct. 2004, 8 pages.
George, D. et al., "A Hierarchical Bayesian Model of Invariant Pattern Recognition in the Visual Cortex," IEEE, Aug. 2005, 6 pages.
Adelson, E.H. et al., "The Perception of Shading and Reflectance," *Perception as Bayesian Inference*, 1996, pp. 409-423, Knill, D.C. et al., eds., Cambridge University Press, UK.
Agrawal, R. et al., "Mining Sequential Patterns," *IEEE*, 1995, pp. 3-14.
Archive of "Numenta Platform for Intelligent Computing Programmer's Guide," Numenta, Mar. 7, 2007, pp. 1-186, www.numenta. com, [Online] Archived by http://archive.org on Mar. 19, 2007; Retrieved on Aug. 13, 2008. Retrieved from the Internet<URL:http:// web.archive.org/web/20070319232606/http://www.numenta.com/ for-developers/softare/pdf/nupic_prog_guide.pdf>.
Becerra, J.A. et al., "Multimodule Artificial Neural Network Architectures for Autonomous Robot Control Through Behavior Modulation," IWANN 2003, *LNCS*, pp. 169-176, vol. 2687.
Ceisel, A. et al., "Using HTM Networks to Decode Neural Signals from the Motor Cortex: A Novel Approach to Brain-Computer Interface Control," Illinois Institute of Technology, Numenta HTM Workshop, 2009, four pages.
Chapela, V., "Preventing Financial Fraud," Smart Security Services, Numenta HTM Workshop, 2009, forty pages.
Colombe, J., "A Survey of Recent Developments in Theoretical Neuroscience and Machine Vision," *Proceedings of the IEEE Applied Imagery Pattern Recognition Workshop*, 2003, nine pages.
Csapo, A.B. et al., "Object Categorization Using VFA-Generated Nodemaps and Hierarchical Temporal Memories," *IEEE International Conference on Computational Cybernetics*, Oct. 7, 2007, pp. 257-262.
Demeris, Y. et al., "From Motor Babbling to Hierarchical Learning by Imitation: A Robot Developmental Pathway," *Proceedings of the Fifth International Workshop on Epigenetic Robotics: Modeling Cognitive Development in Robotic Systems*, 2005, pp. 31-37.
Dimitrova, N. et al., "Motion Recovery for Video Content Classification," *ACM Transactions on Information Systems*, Oct. 1995, pp. 408-439, vol. 13, No. 4.
Ding, C.H.Q., "Cluster Merging and Splitting in Hierarchical Clustering Algorithms," *Proceedings of the 2002 IEEE International Conference on Data Mining (ICDM 2002)*, Dec. 9, 2002, pp. 139-146.
Dolin, R. et al., "Scalable Collection Summarization and Selection," *Association for Computing Machinery*, 1999, pp. 49-58.
Dudgeon, M. et al., "Evolved HTM Preprocessing," Qualia Labs, Jun. 25, 2009, nine pages.
Eastman, K. "HTM's & Airline Passenger Behavior: Prediction and Inference Model," Numenta HTM Workshop, 2009, ten pages.
European Patent Office, Examination Report, European Application No. 05853611.1, Jun. 23, 2008, four pages.
European Patent Office, Examination Report, European Application No. 07750385.2, Apr. 21, 2009, eight pages.
European Patent Office, Examination Report, European Patent Application No. 08796030.8, Dec. 6, 2010, seven pages.
European Patent Office, Examination Report European Patent Application No. 07750385.2, Dec. 6, 2010, eight pages.
Farahmand, N. et al., "Online Temporal Pattern Learning," *Proceedings of the International Joint Conference on Neural Networks*, Jun. 14-19, 2009, pp. 797-802, Atlanta, GA, USA.
Felleman, D.J. et al., "Distributed Hierarchical Processing in the Primate Cerebral Cortex," *Cerebral Cortex*, Jan./Feb. 1991, pp. 1-47, vol. 1.

Fine, S. et al., "The Hierarchical Hidden Markov Model: Analysis and Applications," *Machine Learning*, 1998, pp. 41-62, vol. 32, Kluwer Academic Publishers, Boston.

Foldiak, P., "Learning Invariance from Transformation Sequences," *Neural Computation*, 1991, pp. 194-200, vol. 3, No. 2.

Fukushima, K., "Neocognitron: A Self-Organizing Neural Network Model for a Mechanism of Pattern Recognition Unaffected by Shift in Position," *Biol. Cybernetics*, 1980, pp. 193-202, vol. 36.

Garalevicius, S., "Memory-Prediction Framework for Pattern Recognition: Performance and Suitability of the Bayesian Model of Visual Cortex," *American Association of Artificial Intelligence*, 2007, six pages.

George, D. "Thesis: How the Brain Might Work," Dept. of Electrical Engineering and the Committee on Graduate Studies of Stanford University, Jun. 2008, one-hundred ninety-one pages.

George, D. et al., "A Hierarchical Bayesian Model of Invariant Pattern Recognition in the Visual Cortex," Mar. 2005.

George, D. et al., "Invariant Pattern Recognition Using Bayesian Inference on Hierarchical Sequences," Technical Report, Sep. 17, 2004, pp. 1-8.

George, D. et al., "The HTM Learning Algorithms," Mar. 1, 2007, 44 pages. [Online] [Retrieved on Sep. 22, 2011] Retrieved from the Internet <URL:http://www.numenta.com/htm-overview/education/Numenta_HTM_Learning_Algos.pdf.>.

George, D. et al., "Towards a Mathematical Theory of Cortical Micro-circuits," *PLoS Computational Biology*, Oct. 2009, vol. 5, Issue 10, twenty-six pages.

Gottschalk, K. et al., "Introduction to Web Services Architecture," *IBM Systems Journal*, 2002, pp. 170-177, vol. 41, No. 2.

Guerrier, P., "A Generic Architecture for On-Chip Packet-Switched Interconnections," *Association for Computing Machinery*, 2000, pp. 250-256.

Guinea, D. et al., "Robot Learning to Walk: An Architectural Problem for Intelligent Controllers," *Proceedings of the 1993 International Symposium on Intelligent Control*, Aug. 1993, pp. 493-498, Chicago, USA.

Guo, C-E. et al., "Modeling Visual Patterns by Integrating Descriptive and Generative Methods," *International Journal of Computer Vision*, May 29, 2003, pp. 5-29, vol. 53, No. 1.

Haitani, R., "Smart Video: A Disruptive Market Opportunity for HTM," Numenta HTM Workshop, 2009, twelve pages.

Han, K. et al., "Automated Robot Behavior Recognition Applied to Robotic Soccer," In *Proceedings of the IJCAI-99 Workshop on Team Behaviors and Plan Recognition*, 1999, six pages.

Hartung, J. et al., "Presentation: Support for the Use of Hierarchical Temporal Memory Systems in Automated Design Evaluation: A First Experiment," Numenta HTM Workshop, 2009, thirty-one pages.

Hartung, J. et al., "Support for the Use of Hierarchical Temporal Memory Systems in Automated Design Evaluation: A First Experiment," *Proceedings of the ASME 2009 Int'l. Design Engineering Technical Conferences & Computers and Information in Engineering Conference*, Aug. 30-Sep. 2, 2009, ten pages, San Diego, CA, USA.

Hasegawa, Y. et al., "Learning Method for Hierarchical Behavior Controller," *Proceedings of the 1999 IEEE International Conference on Robotics & Automation*, May 1999, pp. 2799-2804.

Hawkins, J. "Hierarchical Temporal Memory: History-Progress-Today-Tomorrow," HTM Workshop, Jun. 2009, twenty-four pages.

Hawkins, J. "Prediction Toolkit Overview," Numenta HTM Workshop, 2009, four pages.

Hawkins, J. et al., "Hierarchical Temporal Memory, Concepts, Theory, and Terminology," Numenta, Jan. 27, 2007, pp. 1-20.

Hawkins, J. et al., "Hierarchical Temporal Memory: Concepts, Theory and Terminology," Numenta, Inc., Mar. 27, 2007, 20 pages. [Online] [Retrieved on Sep. 22, 2011] Retrieved from the Internet<URL:http://www.numenta.com/htm-overview/education/Numenta_HTM_Concepts.pdf.>.

Hawkins, J. et al., "Hierarchical Temporal Memory: Concepts, Theory and Terminology," Numenta, Mar. 27, 2007, [Online] [Retrieved on Oct. 7, 2008] Retrieved from the Internet<URL:http://www.numenta.com/Numenta_HTM_Concepts.pdf>.

Hawkins, J. et al., "Hierarchical Temporal Memory: Concepts, Theory and Terminology," Numenta, May 10, 2006, [Online] [Retrieved on Oct. 7, 2008] Retrieved from the Internet<URL:http://www.numenta.com/Numenta_HTM_Concepts.pdf>.

Hawkins, J. et al., "On Intelligence," Sep. 2004, Times Books, Henry Holt and Company, New York, NY 10011.

Hawkins, J., "Why Can't a Computer Be More Like a Brain?" *IEEE Spectrum*, Apr. 1, 2007, pp. 21-26, vol. 44, No. 4.

Hernandez-Gardiol, N. et al., "Hierarchical Memory-Based Reinforcement Learning," *Proceedings of Neural Information Processing Systems*, 2001, seven pages.

Hinton, G.E. et al., "The "Wake-Sleep" Algorithm for Unsupervised Neural Networks," *Science*, May 26, 1995, pp. 1158-1161, vol. 268.

Hoey, "Hierarchical unsupervised learning of facial expression categories," *IEEE*, 2001, 0-7695-1293-3, pp. 99-106.

"HTM Algorithms," Numenta®, Jun. 2008, Numenta HTM Workshop, Jun. 23-24, 2008, SRI Campus, Menlo Park, CA, 67 pages.

"HTM Optimized Drug Therapy," SDSystem24.com, Numenta HTM Workshop, Jun. 2324, 2008, SRI Campus, Menlo Park, CA 7 pages.

"HTM Workshop, Jumpstart," Numenta®, Jun. 2008, Numenta HTM Workshop, Jun. 23-24, 2008, SRI Campus, Menlo Park, 86 pages.

Hyvarinen, A. et al., "Bubbles: A Unifying Framework for Low-Level Statistical Properties of Natural Image Sequences," *J. Opt. Soc. Am. A.*, 2003, pp. 1237-1252, vol. 20, No. 7.

Isard, M. et al., "ICONDENSATION: Unifying Low-Level and High-Level Tracking in a Stochastic Framework," *Lecture Notes in Computer Science 1406*, 1998, pp. 893-908, Burkhardt, H. et al., ed., Springer-Verlag, Berlin.

Kim, J. et al., "Hierarchical Distributed Genetic Algorithms: A Fuzzy Logic Controller Design Application," *IEEE Expert*, Jun. 1996, pp. 76-84.

Kuenzer, A. et al., "An Empirical Study of Dynamic Bayesian Networks for User Modeling," *Proceedings of the UM 2001 Workshop on Machine Learning*, ten pages.

Lee, T.S. et al., "Hierarchical Bayesian Inference in the Visual Cortex," *J. Opt. Soc. Am. A. Opt. Image. Sci. Vis.*, Jul. 2003, pp. 1434-1448, vol. 20, No. 7.

Lenser, S. et al., "A Modular Hierarchical Behavior-Based Architecture," *RoboCup 2001, LNAI 2377*, 2002, pp. 423-428, Birk, A. et al, (eds.), Springer-Verlag, Berlin, Heidelberg.

Lewicki, M.S. et al., "Bayesian Unsupervised Learning of Higher Order Structure," *Proceedings of the 1996 Conference in Advances in Neural Information Processing Systems 9*, pp. 529-535.

Lim, "Estimation of Occlusion and Dense Motion Fields in a Bidirectional Bayesian Framework," *IEEE Transactions on Pattern Analysis and Machine Intelligence*, 2002, pp. 712-718, vol. 24, No. 5.

Lo, J. "Unsupervised Hebbian Learning by Recurrent Multilayer Neural Networks for Temporal Hierarchical Pattern Recognition," *Information Sciences and Systems 44th Annual Conference on Digital Object Identifier*, 2010, pp. 1-6.

Majure, L., "Unsupervised Phoneme Acquisition Using HTM," Jun. 25, 2009, eight pages.

Mannes, C., "A Neural Network Model of Spatio-Temporal Pattern Recognition, Recall and Timing," Technical Report CAS/CNS-92-013, Feb. 1992, Department of Cognitive and Neural Systems, Boston University, USA, seven pages.

Mari, J.-F. et al., "Temporal and Spatial Data Mining with Second-Order Hidden Markov Models," *Soft Computing—A Fusion of Foundations, Methodologies and Applications*, 2006, pp. 406-414, vol. 10, No. 5.

Miller, J. W. et al., "Biomimetic Sensory Abstraction Using Hierarchical Quilted Self-Organizing Maps," *Society of Photo-Optical Instrumentation Engineers*, 2006, eleven pages.

Mishkin, M. et al., "Hierarchical Organization of Cognitive Memory," *Phil. Trans. R. Soc. B.*, 1997, pp. 1461-1467, London.

Muckli, L., "Predictive Coding in Apparent Motion," University of Glasgow, Numenta HTM Workshop, Jun. 25, 2009, twelve pages.

Murphy, K. et al., "Using the Forest to See the Trees: A Graphical Model Relating Features, Objects and Scenes,"*Advances in Neural Processing System*, 2004, vol. 16, eight pages.

Murray, S.O. et al., "Shaper Perception Reduces Activity in Human Primary Visual Cortex," *Proceedings of the Nat. Acad. of Sciences of the USA*, Nov. 2002, pp. 15164-151169, vol. 99, No. 23.

Namphol, A. et al., "Image Compression with a Hierarchical Neural Network," *IEEE transactions on Aerospace and Electronic Systems*, Jan. 1996, pp. 326-338, vol. 32, No. 1.

Naphade, M. et al., "A Probabilistic Framework for Semantic Video Indexing, Filtering, and Retrieval," *IEEE Transactions on Multimedia*, Mar. 2001, pp. 141-151, vol. 3, No. 1.

Niemasik, J. "Vision Toolkit," Numenta HTM Workshop, 2009, twenty-eight pages.

Numenta, Inc., "Business Strategy," Numenta HTM Workshop, 2009, fifteen pages.

Numenta, Inc., "Hierarchical Temporal Memory including HTM Cortical Learning Algorithms, Version 0.2.1," Sep. 12, 2011, sixty-eight pages. [Online] [Retrieved Sep. 22, 2011] Retrieved from the Internet <URL:http://www.numenta.com/htm-overview/education/HTM_CorticalLearningAlgorithms.pdf.>.

Numenta, Inc., "Hierarchical Temporal Memory: Comparison with Existing Models, Version 1.01," Mar. 1, 2007, four pages.

Numenta, Inc., "Numenta Node Algorithms Guide NuPIC 1.6," Numenta, Jul. 22, 2008, pp. 1-7.

Numenta, Inc., "Numenta Node Algorithms Guide NuPIC 1.6," Numenta, Jun. 13, 2008, pp. 1-6.

Numenta, Inc., "Numenta Platform for Intelligent Computing: Programmer's Guide Version 1.0," Mar. 2007, seventy-seven pages.

Numenta, Inc., "NuPIC Update," Numenta HTM Workshop, 2009, twenty-four pages.

Numenta, Inc., "Prototype to Demonstrate Automated Insect Detection and Discrimination," Numenta HTM Workshop, 2009, four pages.

Numenta, Inc., "Smart Music: Combining Musical Expectations with Algorithmic Composition," Numenta HTM Workshop, 2009, seven pages.

Numenta, Inc., "Technical Keynote," Numenta HTM Workshop, 2009, seventy-two pages.

Numenta, Inc., "Temporal Model Characteristics," Numenta HTM Workshop, 2009, fourteen pages.

Numenta, Inc., "What Have We Worked on Since the 2008 Workshop? Customer Applications Presentation," Numenta HTM Workshop, 2009, thirty-five pages.

Numenta, Inc., "Zeta1 Algorithms Reference, Version 1.2," Numenta Inc., Jun. 8, 2007, pp. 1-38.

Numenta, Inc., "Zeta1 Algorithms Reference, Version 1.3," Numenta Inc., Aug. 22, 2007, pp. 1-41.

Numenta, Inc., "Zeta1 Algorithms Reference, Version 1.5," Numenta Inc., Aug. 24, 2007, pp. 1-45.

Olshausen, B.A. et al., "A Neurobiological Model of Visual Attention and Invariant Pattern Recognition Based on Dynamic Routing Information," *Journal of Neuroscience*, Nov. 1993, pp. 4700-4719, vol. 13, No. 11.

PCT International Search Report and Written Opinion, PCT Application No. PCT/US2007/003544, Jun. 16, 2008, ten pages.

PCT International Search Report and Written Opinion, PCT Application No. PCT/US07/85661, Jun. 13, 2008, six pages.

PCT International Search Report and Written Opinion, PCT Application No. PCT/US08/55389, Jul. 25, 2008, seven pages.

PCT International Search Report and Written Opinion, PCT Application No. PCT/US08/55352, Aug. 1, 2008, seven pages.

PCT International Search Report and Written Opinion, PCT Application No. PCT/US2008/054631, Aug. 18, 2008, twelve pages.

PCT International Search Report and Written Opinion, PCT Application No. PCT/US2008/068435, Oct. 31, 2008, eleven pages.

PCT International Search Report and Written Opinion, PCT Application No. PCT/US2009/035193, Apr. 22, 2009, eleven pages.

PCT International Search Report and Written Opinion, PCT Application No. PCT/US2011/028231, May 19, 2011, nine pages.

PCT International Search Report and Written Opinion, PCT Application No. PCT/US2009/047250, Sep. 25, 2009, twelve pages.

Pearl, J., "Probabilistic Reasoning in Intelligent Systems: Networks of Plausible Inference," 1988, pp. 143-223, Morgan Kaufmann Publishers, Inc.

Poppel, E., "A Hierarchical Model of Temporal Perception," *Trends in Cognitive Sciences*, May 1997, pp. 56-61, vol. 1, No. 2.

"Problem Solving with HTMs," Numenta®, Jun. 2008, Numenta HTM Workshop, Jun. 23-24, 2008, SRI Campus, Menlo Park, CA, 23 pages.

Saphir, B. "Numenta Web Services," Numenta HTM Workshop, 2009, twenty pages.

Sinha, P. et al., "Recovering Reflectance and Illumination in a World of Painted Polyhedra," *Fourth International Conference on Computer Vision*, Berlin, May 11-14, 1993, pp. 156-163, IEEE Computer Society Press, Los Alamitos, CA.

Spence, C. et al., "Varying Complexity in Tree-Structured Image Distribution Models," *IEEE Transactions on Image Processing*, Feb. 2006, pp. 319-330, vol. 15, No. 2.

Starzyk, J.A. et al., "Spatio-Temporal Memories for Machine Learning: A Long-Term Memory Organization," *IEEE Transactions on Neural Networks*, May 2009, pp. 768-780, vol. 20, No. 5.

Stringer, S.M. et al., "Invariant Object Recognition in the Visual System with Novel Views of 3D Objects," *Neural Computation*, Nov. 2002, pp. 2585-2596, vol. 14, No. 11.

Sudderth, E.B. et al., "Nonparametric Belief Propagation and Facial Appearance Estimation," Al Memo 2002-020, Dec. 2002, Artificial Intelligence Laboratory, Massachusetts Institute of Technology, Cambridge, MA, USA, eleven pages.

Thomson, A.M. et al., "Interlaminar Connections in the Neocortex," *Cerebral Cortex*, 2003, pp. 5-14, vol. 13, No. 1.

Thornton, J. et al., "Robust Character Recognition Using a Hierarchical Bayesian Network," *Proceedings of the 19th Australian Joint Conference on Artifical Intelligence*, 2006, pp. 1259-1264.

Tsinarakis, G.J. et al. "Modular Petri Net Based Modeling, Analysis and Synthesis of Dedicated Production Systems," *Proceedings of the 2003 IEEE International Conference on Robotics and Automation*, Sep. 14-19, 2003, pp. 3559-3564, Taipei, Taiwan.

Tsinarakis, G.J. et al. "Modular Petri Net Based Modeling, Analysis, Synthesis and Performance Evaluation of Random Topology Dedicated Production Systems," *Journal of Intelligent Manufacturing*, 2005, vol. 16, pp. 67-92.

Tsukada, M, "A Theoretical Model of the Hippocampal-Cortical Memory System Motivated by Physiological Functions in the Hippocampus", *Proceedings of the 1993 International Joint Conference on Neural Networks*, Oct. 25, 1993, pp. 1120-1123, vol. 2.

U.S. Office Action, U.S. Appl. No. 11/147,069, Jan. 9, 2007, twenty-seven pages.

U.S. Office Action, U.S. Appl. No. 11/147,069, Jul. 29, 2009, forty-three pages.

U.S. Office Action, U.S. Appl. No. 11/147,069, Jan. 9, 2009, thirty-eight pages.

U.S. Office Action, U.S. Appl. No. 11/147,069, May 15, 2008, thirty-seven pages.

U.S. Office Action, U.S. Appl. No. 11/147,069, May 29, 2007, thirty-six pages.

U.S. Office Action, U.S. Appl. No. 11/147,069, Oct. 30, 2007, thirty-four pages.

U.S. Office Action, U.S. Appl. No. 11/622,454, Jun. 3, 2008, thirteen pages.

U.S. Office Action, U.S. Appl. No. 11/622,454, Mar. 30, 2009, eleven pages.

U.S. Office Action, U.S. Appl. No. 11/622,455, Apr. 21, 2010, twelve pages.

U.S. Office Action, U.S. Appl. No. 11/622,456, Mar. 20, 2009, nine pages.

U.S. Office Action, U.S. Appl. No. 11/622,456, May 7, 2008, fourteen pages.

U.S. Office Action, U.S. Appl. No. 11/622,456, Nov. 6, 2008, seven pages.

U.S. Office Action, U.S. Appl. No. 11/622,457, Apr. 21, 2009, six pages.

U.S. Office Action, U.S. Appl. No. 11/622,457, Aug. 24, 2007, ten pages.

U.S. Office Action, U.S. Appl. No. 11/622,457, May 6, 2008, fourteen pages.

U.S. Office Action, U.S. Appl. No. 11/622,457, Nov. 20, 2008, eight pages.

U.S. Office Action, U.S. Appl. No. 11/622,458, Apr. 1, 2010, sixteen pages.

U.S. Office Action, U.S. Appl. No. 11/680,197, Mar. 23, 2010, twelve pages.
U.S. Office Action, U.S. Appl. No. 11/713,157, Mar. 31, 2010, fourteen pages.
U.S. Office Action, U.S. Appl. No. 11/945,919, Sep. 7, 2010, nineteen pages.
U.S. Office Action, U.S. Appl. No. 12/039,652, Mar. 29, 2011, fifteen pages.
U.S. Office Action, U.S. Appl. No. 13/218,194, Oct. 5, 2012, fourteen pages.
U.S. Office Action, U.S. Appl. No. 13/333,865, May 16, 2012, twenty-four pages.
U.S. Office Action, U.S. Appl. No. 12/483,642, Aug. 10, 2012, seven pages.
U.S. Office Action, U.S. Appl. No. 12/483,642, Apr. 26, 2012, twelve pages.
U.S. Appl. No. 13/604,543, filed Sep. 5, 2012.
U.S. Appl. No. 12/029,434, filed Feb. 11, 2008.
Van Essen, D.C. et al., "Information Processing Strategies and Pathways in the Primate Visual System," *An Introduction to Neural and Electronic Networks*, 1995, pp. 45-76.
"Vision Framework," Numenta®, Jun. 2008, Numenta HTM Workshop, Jun. 23-24, 2008, SRI Campus, Menlo Park, CA 36 pages.
Vlajic, "Vector Quantization of Images Using Modified Adaptive Resonance Algorithm for Hierarchical Clustering," *IEEE Transactions on Neural Networks*, 2001, pp. 1147-1162, vol. 12, No. 5.
Weiss, R. et al., "HyPursuit: A Hierarchical Network Search Engine that Exploits Content-Link Hypertext Clustering," *Proceedings of the Seventh Annual ACM Conference on Hypertext*, Mar. 16-20, 1996, pp. 180-193, Washington, D.C., USA.
Wiskott, L. et al., "Slow Feature Analysis: Unsupervised Learning of Invariances," *Neural Computation*, 2002, pp. 715-770, vol. 14, No. 4.
Wu, G. et al., "Multi-camera Spatio-temporal Fusion and Biased Sequence-data Learning for Security Surveillance," *Association for Computing Machinery*, 2003, pp. 528-538.
Yedidia, J.S. et al., "Understanding Belief Propagation and its Generalizations," *Joint Conference on Artificial Intelligence (IJCAI 2001)*, Aug. 4-10, 2001, Seattle, WA, USA, thirty-five pages.
Zemel, R.S., "Cortical Belief Networks," *Computational Models for Neuroscience*, 2003, pp. 267-287, Hecht-Nielsen, R. et al., eds., Springer-Verlag, New York.
U.S. Patent Office, Non-final Office Action, U.S. Appl. No. 12/052,580, Dec. 21, 2012, twenty-three pages.
United States Office Action, U.S. Appl. No. 12/029,434, Nov. 8, 2011, thirty-six pages.

* cited by examiner

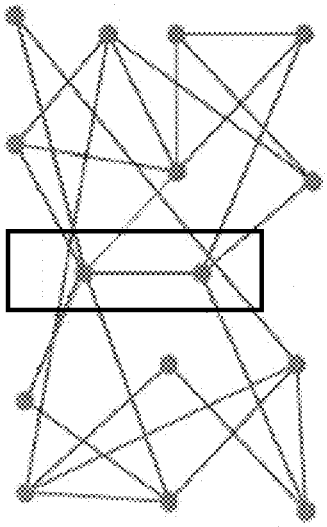
*FIGURE 12A*
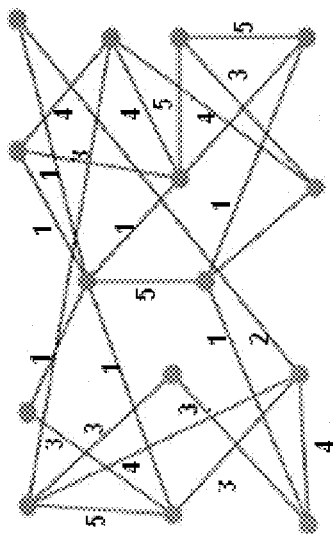
*FIGURE 12B*
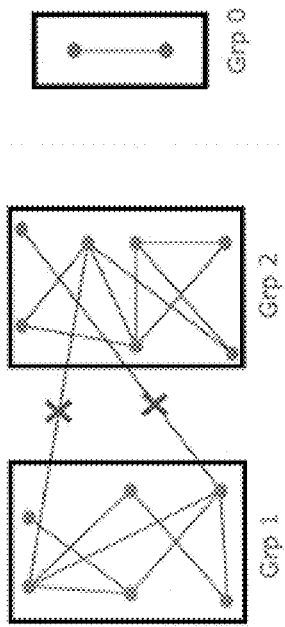
*FIGURE 12C*
*FIGURE 12D*

SPATIO-TEMPORAL LEARNING ALGORITHMS IN HIERARCHICAL TEMPORAL NETWORKS

RELATED APPLICATIONS

This is a continuation of U.S. patent application Ser. No. 12/039,630 filed on Feb. 28, 2008, which claims priority to Provisional Patent Application No. 60/904,634 filed on Feb. 28, 2007, which are incorporated by reference herein in their entirety.

FIELD OF THE INVENTION

The present invention is directed toward the field of machine learning using Hierarchical Temporal Memory (HTM) systems and learning probability distributions based on spatio-temporal algorithms.

BACKGROUND

Machine learning has generally been thought of and attempted to be implemented in the context of artificial intelligence. Artificial intelligence depends on algorithmic solutions (e.g., a computer program) to replicate particular human acts and/or behaviors. The study of neural networks is a sub-area of artificial intelligence which attempts to mimic certain human brain behavior by using individual processing elements that are interconnected by adjustable connections.

In human cognition, perception and understanding of phenomena happen over time and space. Both time and space are used to generalize the things that we perceive and sense. For example, we learn things have a common cause based on "temporal adjacency", meaning that two phenomena around the same time. Spatial similarity refers to our ability to distinguish an objects are the same or belong to the same group of objects based on perceived similarity.

Spatial and temporal perception work synergistically in cognition. The inability to both spatial similarity and temporal events has been a fundamental limitation in most traditional machine learning models.

SUMMARY

The above needs are met by computer program products, computer-implemented methods and HTM networks which implement spatio-temporal learning nodes.

According to one aspect of one or more embodiments of the present invention, the present invention provides a computer-implemented hierarchical network comprising a plurality of spatio-temporal learning nodes. Each spatio-temporal learning node in the computer implemented hierarchical network comprises a spatial pooler and a temporal pooler. The spatial pooler is adapted to receive a sensed input pattern. The spatial pooler is further adapted to generate a first set of spatial probabilities associated with a set of spatial co-occurrence patterns, wherein each spatial co-occurrence pattern represents a first set of one or more sensed input patterns and each spatial probability in the first set of spatial probabilities indicates the likelihood that the sensed input pattern has the same cause as a spatial co-occurrence pattern. The temporal pooler is adapted to receive the first set of spatial probabilities from the spatial pooler. The temporal pooler is further adapted to generate a set of temporal probabilities associated with a set of temporal groups based at least in part the first set of spatial probabilities, wherein each temporal group comprises one or more temporally co-occurring input patterns and each temporal probability indicates the likelihood that the sensed input pattern has the same cause as the one or more temporally co-occurring input patterns in a temporal group. The temporal pooler is further adapted to transmit the set of temporal probabilities to a parent node in the hierarchical network of nodes.

According to another aspect of the present invention, the present invention provides a computer-readable storage medium encoded with computer program code for the computer-implemented hierarchical network comprising a plurality of spatio-temporal learning nodes described above.

According to another aspect of the present invention, the present invention provides a computer-implemented hierarchical network comprising a plurality of spatio-temporal learning nodes assigned to a plurality of hierarchical levels. Each spatio-temporal learning node is adapted to receive a plurality of input patterns. Each spatio-temporal learning node is further adapted to execute a temporal pooling algorithm to identify temporal groups, wherein each temporal group comprises one or more input patterns which temporally co-occur. Each spatio-temporal learning node is further adapted to execute a spatial pooling algorithm to identify subsets of one or more input patterns that can be represented using a spatial co-occurrence pattern, wherein the spatial pooling algorithm executed by each node is defined by a hierarchical level the spatio-temporal learning node is assigned to.

According to another aspect of the present invention, the present invention provides a computer-readable storage medium encoded with computer program code for the computer-implemented hierarchical network comprising a plurality of spatio-temporal learning nodes assigned to a plurality of hierarchical levels described above.

Other aspects of the invention will be apparent from the following description and the appended claims.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIG. 12(a) illustrated a graph representing a time-adjacency matrix. FIG. 12(b) illustrates the selection of nodes in the graph according in accordance with an embodiment of the present invention. FIG. 12(c) shows a grouping of a graph into three sub-graphs in accordance with an embodiment of the present invention. FIG. 12(d) shows a time adjacency matrix.

DETAILED DESCRIPTION

Figure 1:
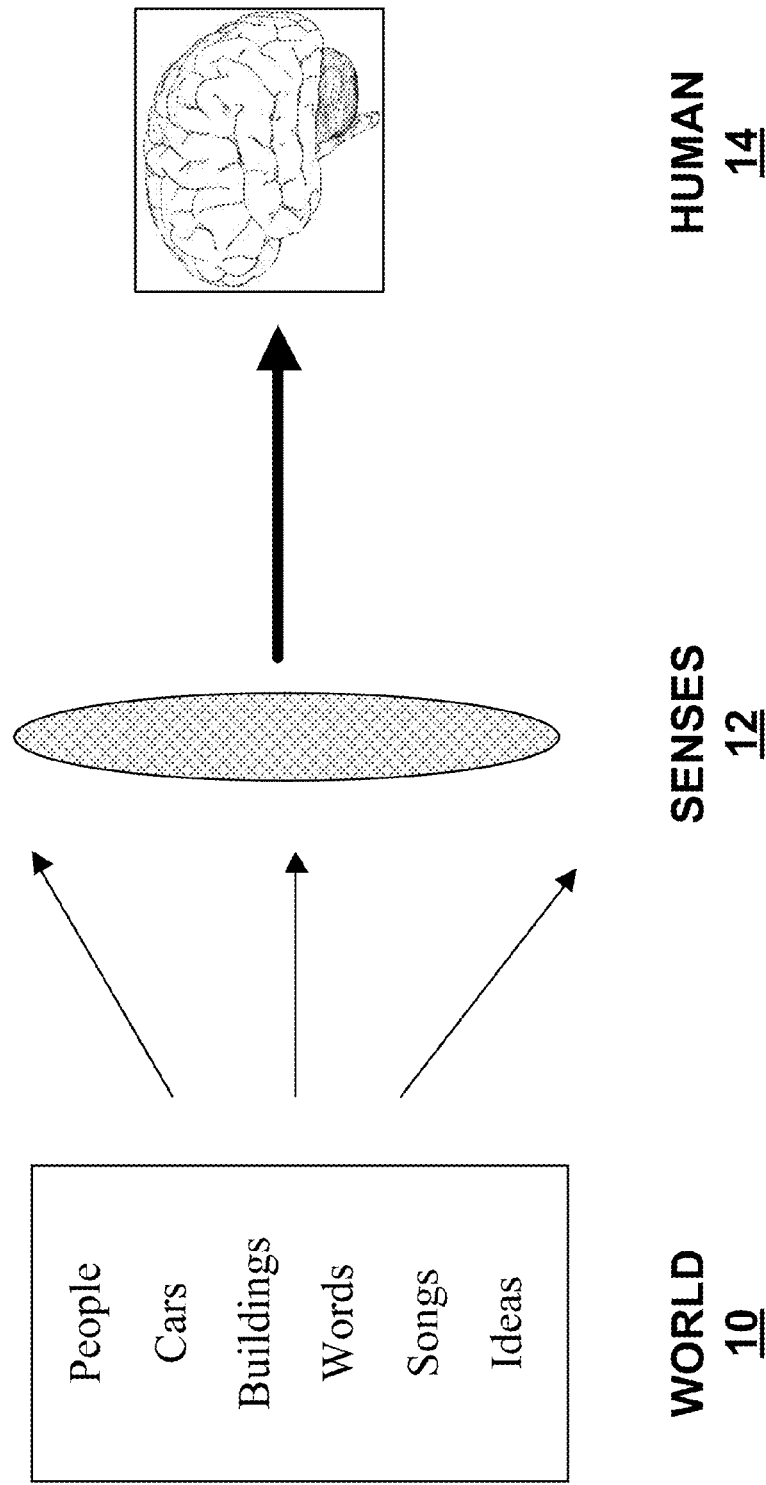
FIG. 1 shows a flow of data between an object and a human.

In the following description of embodiments of the present invention, numerous specific details are set forth in order to provide a more thorough understanding of the present invention. However, note that the present invention may be practiced without one or more of these specific details. In other instances, well-known features have not been described in detail to avoid unnecessarily complicating the description.

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

Humans understand and perceive the world in which they live as a collection—or more specifically, a hierarchy of objects. An "object" is at least partially defined as having some persistent structure over space and/or time. For example, an object may be a car, a person, a building, a word, a song, an abstract entity such as a concept or information flowing in a network.

Moreover, referring to FIG. 1, an object in the world 10 may also be referred to as a "cause" in that the object causes particular data to be sensed, via senses 12, by a human 14. For example, the smell (sensed input data) of a rose (object/cause) results in the recognition/perception of the rose. In another example, the image (sensed input data) of a dog (object/cause) falling upon a human eye results in the recognition/perception of the dog. Even as sensed input data caused by an object change over space and time, humans want to stably perceive the object because the cause of the changing sensed input data, i.e., the object itself, is unchanging. For example, the image (sensed input data) of a dog (object/cause) falling upon the human eye may change with changing light conditions and/or as the human moves; yet, however, the human is able to form and maintain a stable perception of the dog.

In embodiments of the present invention, learning causes and associating novel input with learned causes are achieved using what may be referred to as a "hierarchical temporal memory" (HTM). An HTM is a hierarchical network of interconnected nodes that individually and collectively (i) learn, over space and time, one or more causes of sensed input data and (ii) determine, dependent on learned causes, likely causes of novel sensed input data. HTMs, in accordance with one or more embodiments of the present invention, are further described below with reference to FIGS. 2-20.

HTM Structure

Figure 2:
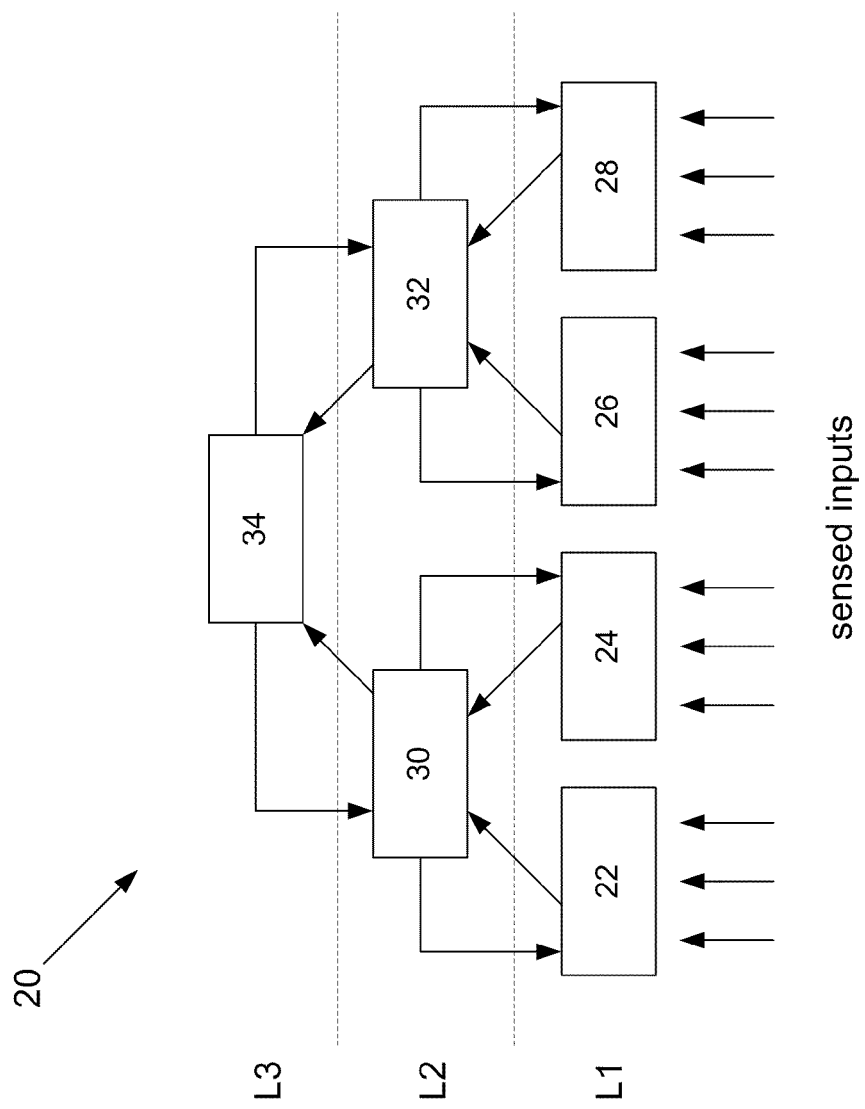
FIG. 2 shows a HTM in accordance with an embodiment of the present invention.

An HTM has one or more levels of nodes. For example, as shown in FIG. 2, HTM 20 has three levels L1, L2, L3, with level L1 being the lowest level, level L3 being the highest level, and level L2 being between levels L1 and L3. Level L1 has nodes 22, 24, 26, 28; level L2 has nodes 30, 32, and level L3 has node 34. The nodes 22, 24, 26, 28, 30, 32, 34 are hierarchically connected in a tree-like structure such that each node may have several children nodes (i.e., nodes connected at a lower level) and one parent node (i.e., node connected at a higher level). Note that it is also possible to have a single child node connected to multiple parent nodes. Each node 22, 24, 26, 28, 30, 32, 34 may have or be associated with a capacity to store and process information. For example, each node 22, 24, 26, 28, 30, 32, 34 may store sensed input data (e.g., groups of patterns) associated with or derived from particular causes. Further, each node 22, 24, 26, 28, 30, 32, 34 may be arranged to (i) propagate information "forward" (i.e., "up" an HTM hierarchy) to any connected parent node and/or (ii) propagate information "backward" (i.e., "down an HTM hierarchy) to any connected children nodes.

The nodes are associated or coupled to each other by links. A link represents a logical or physical relationship between an output of a node and an input of another node. Outputs from a node in the form of variables are communicated between the nodes via the links.

Inputs to the HTM 20 from, for example, a sensory system, are supplied to the level L1 nodes 22, 24, 26, 28. A sensory system through which sensed input data is supplied to level L1 nodes 22, 24, 26, 28 may relate to commonly thought-of human senses (e.g., touch, sight, sound) or other human or non-human senses.

The range of sensed input data that each of the level L1 nodes 22, 24, 26, 28 is arranged to receive is a subset of an entire input space. For example, if an 8×8 image represents an entire input space, each level L1 node 22, 24, 26, 28 may receive sensed input data from a particular 4×4 section of the 8×8 image. Each level L2 node 30, 32, by being a parent of more than one level L1 node 22, 24, 26, 28, covers more of the entire input space than does each individual level L1 node 22, 24, 26, 28. It follows that in FIG. 2, the level L3 node 34 covers the entire input space by receiving, in some form, the sensed input data received by all of the level L1 nodes 22, 24, 26, 28. Moreover, in one or more embodiments of the present invention, the ranges of sensed input data received by two or more nodes 22, 24, 26, 28, 30, 32, 34 may overlap.

While HTM 20 in FIG. 2 is shown and described as having three levels, an HTM in accordance with one or more embodiments of the present invention may have any number of levels. Moreover, the hierarchical structure of an HTM may be different than that shown in FIG. 2. For example, an HTM may be structured such that one or more parent nodes have three children nodes as opposed to two children nodes like that shown in FIG. 2. Further, in one or more embodiments of the present invention, an HTM may be structured such that a parent node in one level of the HTM has a different number of children nodes than a parent node in the same or another level of the HTM. Further, in one or more embodiments of the present invention, an HTM may be structured such that a parent node receives input from children nodes in multiple levels of the HTM. Further, the sensed input data may be received by nodes at levels other than the lowest level L1. In general, note that there are various and numerous ways to structure an HTM other than as shown in FIG. 2.

Any entity that uses or is otherwise dependent on an HTM as, for example, described above with reference to FIG. 2 and below with reference to FIGS. 3-19, may be referred to as an "HTM-based" system. Thus, for example, an HTM-based system may be a machine that uses an HTM, either implemented in hardware or software, in performing or assisting in the performance of a task.

Learning Causes

In embodiments of the present invention, an HTM discovers one or more causes in its world from sensory input data received by the HTM. In other words, an HTM does not necessarily have a sense particular to each of the types of causes being sensed; instead, an HTM may discover from raw sensed input data that causes such as cars and words exist. In such a manner, an HTM is able to learn and form representations of causes existing in its world.

As described above, an "object" has persistent structure. The persistent structure causes persistent patterns to be sensed by an HTM. Each sensed input pattern has one or more spatial attributes. In other words, each sensed input pattern may be thought of as being represented as a particular set of bits. In general, a node in an HTM "learns," i.e., stores and associates with a common cause, sensed input patterns by determining co-occurrences of sensed input patterns in its input. Determining co-occurrences of sensed input patterns involves determining which sensed input patterns are active at around the same time at a rate statistically greater than what would be expected based on mere chance. For example, if an HTM node having one hundred inputs has seven inputs that become active together at some statistically significant rate, then the HTM node learns that the sensed input patterns at those seven inputs co-occur.

Further, in one or more embodiments of the present invention, it may not be necessary for an HTM node to learn all sensed input patterns occurring together at some statistically significant rate. For example, an HTM node may store the x most common sensed input patterns found in its input. Alternatively, an HTM node may store sensed input patterns according a pre-defined measure of significance (e.g. uniqueness).

Pooling

As described above, learning causes in an HTM-based system involves learning patterns and groups of patterns. In general, patterns and groups of patterns that co-occur frequently are stored and assigned to the same causes. For example, groups of patterns that co-occur frequently at some statistically significant rate may be assigned to the same cause. Accordingly, learning causes may effectively entail mapping many patterns and/or inputs to a single cause. Such assigning of multiple patterns and/or inputs to a single cause may also be referred to as "pooling."

Spatial groups are learned using a series of different spatial pooling programs. Spatial group learning attempts to learn a set of meaningful co-occurrences in a set of input patterns. Spatial pooling is dependent on "spatial" similarities between two or more patterns (noting that a pattern may actually represent a sequence from a lower level). In embodiments which use spatial pooling, an HTM node may compare a spatial property of a received sensed input pattern with that of a learned sensed input pattern (or "quantization" point). If the two patterns are "similar enough" (i.e., have enough "overlap"), then the received sensed input pattern may be assigned to the same cause as that of the quantization point. For example, if a quantization point is equal to '10010110', then a received sensed input pattern of '10011110' may be assigned to the same cause as that of the quantization point due to there being a difference of only one bit between the two patterns. Note that the amount of similarity needed to perform such "spatial" pooling may vary within and/or among HTM-based systems.

Temporal groups are learned using temporal pooling algorithms that recognize sensed input patterns that occur together at a rate statistically greater than what would be expected based on mere chance. For example, if of fifty sensed input patterns learned by an HTM node, three occur in order at some statistically significant rate, then the HTM node may learn that group of sensed input patterns One type of temporal pooling involves assigning patterns to the same cause based on temporal adjacency. For example, if an HTM node receives pattern A followed by pattern B followed by pattern D, then patterns A, B, and D may be assigned to the same cause as there is some likelihood that this sequence of patterns was caused by the same object. Accordingly, such "temporal" pooling enables the mapping of patterns, some or all of which may have no significant spatial overlap, to a single cause.

The assignation of patterns to temporal groups representing a single cause enables the application of HTMs to single point or "flash inference" problems in which an unknown single pattern or input is to be assigned a cause. Although, temporal groups are learned over time by the group learner, there needs to be no temporal information associated with the newly sensed input or pattern upon which inference is performed: In this way, temporal grouping or "pooling" allows the exploitation of temporal co-occurrence in the learning stage but does not require temporal information for inference. This type of inference may be applied in image recognition systems trained on temporal data such as face recognition systems, medical image classification systems and satellite image recognition. Flash inference may also be applied to audio data such as in speaker identification. Other applications of flash inference include monitoring engine and electronics data, climate and weather modeling and prediction and stock market prediction.

In one or more embodiments of the present invention, the temporal groups learned by a HTM node may each be represented by one or more variables. As each learned temporal group is associated with a particular cause, each variable accordingly represents a different cause. The HTM node may pass each of its variables up to a parent node via a vector containing probabilities as to the likelihood that each of its learned groups is active at its input at a given time. The parent node may then (i) determine temporal adjacencies of its sensed input patterns (i.e., the variables received from its child node), (ii) learn sensed input patterns as described above, and (iii) learn high-order groups of learned sensed input patterns (i.e., learn groups of temporally co-occurring variables representing groups learned by its child node).

Spatio-Temporal Learning (STL) Nodes

Figure 3:
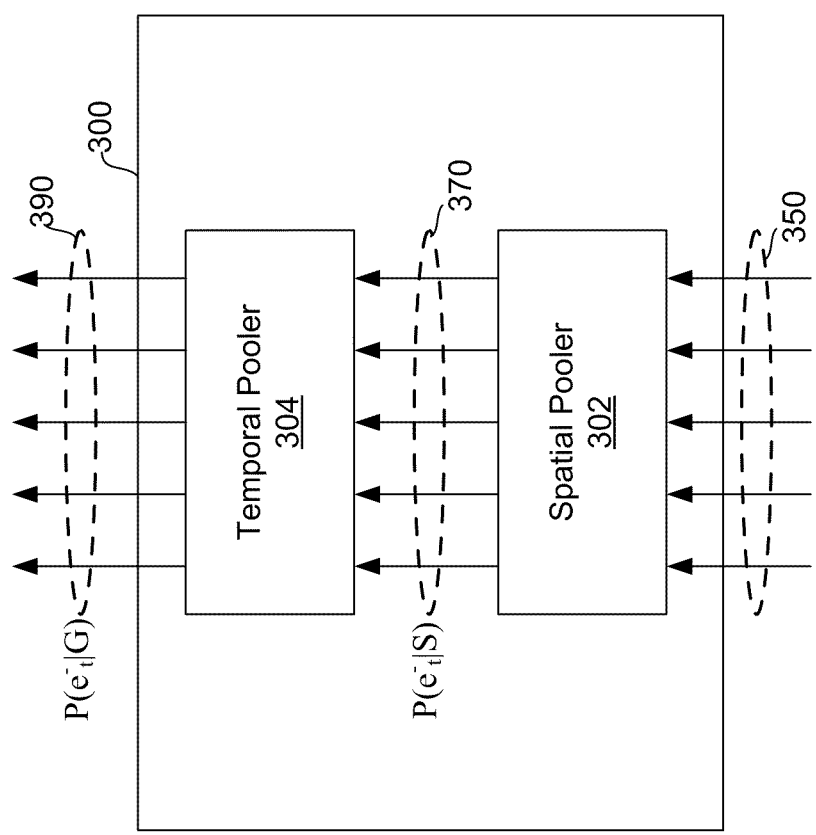
FIG. 3 shows a spatio-temporal learning (STL) node in accordance with an embodiment of the present invention.

A spatio-temporal learning (STL) node is comprised of one or more HTM nodes which learn both spatial and temporal groups of sensed input patterns. STL nodes learn spatial and temporal groups of inputs over time. FIG. 3, illustrates a STL node 300 according to one embodiment. The STL node 300 comprises a spatial pooler 302 which is used to determine spatial groups in the set of sensed input patterns. The STL nodes 300 further comprises a temporal pooler 304 used to determine groups of sensed input patterns that temporally co-occur. According to the embodiment, each STL node 300 may contain additional programs which govern the operation of the spatial pooler and temporal pooler based on aspects of the node.

The spatial pooler 302 receives some input patterns 350. Generally, the spatial pooler 302 identifies spatial co-occurrences among input patterns. At each time-step, the spatial pooler 302 outputs a set of probabilities $P(e^-_t|S)$ 370, where $P(e^-_t|S)$ represents the probability of observing $e^-$ (evidence or input patterns from a lower level) at time t when over learned spatial co-occurrences S. Thus, for example, at time t, the first entry in $P(e^-_t|S)$ is $P(e^-_t|S_1)$, the second entry is $P(e^-_t|S_2)$, and so forth. In one embodiment, the set of probabilities $P(e^-_t|S)$ 370 are communicated outside of the spatial pooler 302. Further, note that the spatial pooler 302, has a behavior (i.e., outputting distributions over learned spatial groups of sensed input patterns) that may be dependent on the type and/or topology of network of which the spatial pooler 302 is part.

Based on the set of probabilities $P(e^-_t|S)$ 370 outputted over time by the spatial pooler 302, the temporal pooler 304 outputs a set of probabilities $P(e^-_t|G)$ 390, where $P(e^-_t|G)$ represents the probability of observing $e^-$ (evidence from a lower level) at time t over learned temporal groups G. Thus, each entry in the set of probabilities $P(e^-_t|G)$ 390 corresponds to a different learned temporal group $G_i$. In one or more embodiments of the present invention, the learned temporal groups themselves may not be communicated outside of the temporal pooler 304. Further, note that the temporal pooler 304, has a behavior (i.e., outputting distributions over learned groups of sensed input patterns) that may be dependent on the type and/or topology of network of which the group learner 44 is part.

In some embodiments, a STL node 300 may comprise more than one HTM node. In one embodiment, a STL node 300 may comprise one HTM node executing a spatial pooler 302 which outputs a set of probabilities $P(e^-_t|S)$ 370 that is communicated to another HTM node executing a temporal pooler 304. In another embodiment, a STL node 300 may comprise one or more HTM nodes executing spatial poolers 302 which output one or more sets of probabilities $P(e^-_t|S)$ 370 that are communicated to one or more HTM nodes executing temporal poolers 304. In a specific embodiment, a STL node 300 may comprise multiple HTM nodes executing spatial poolers 302 and a single HTM node executing a single temporal pooler 304.

Figure 4:
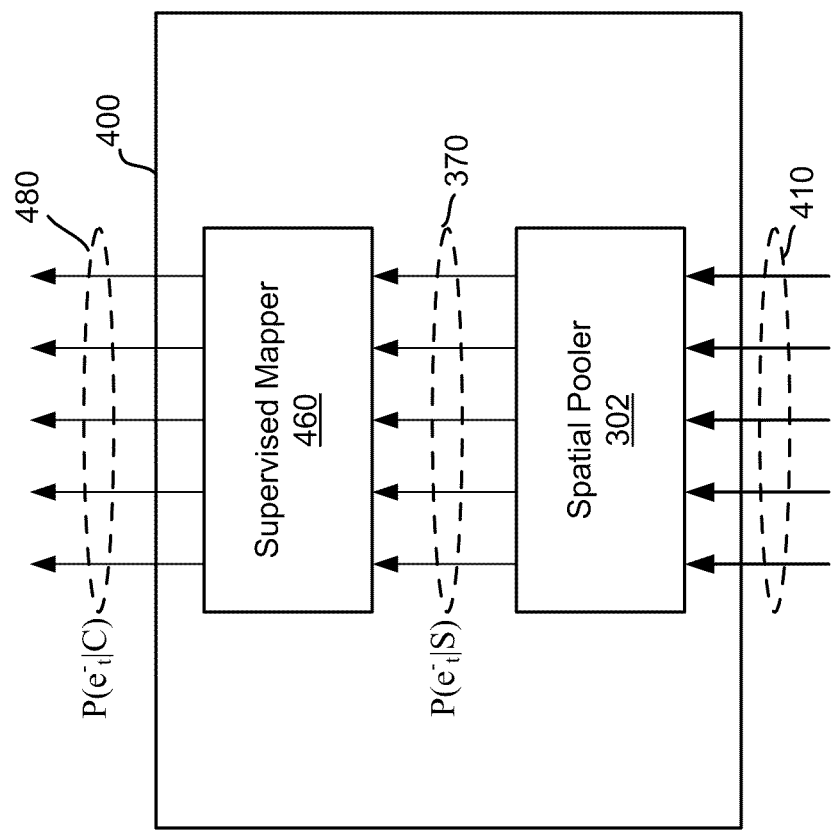
FIG. 4 shows a STL top node in accordance with an embodiment of the present invention.

FIG. 4 provides an illustration of a STL top node 400. A STL top node 400 is a node in the HTM network which is at the top of the hierarchy of nodes and directly or indirectly receives inputs from the all of the nodes in the HTM network. The STL top node 400 receives a set of inputs 410 that represent a set of probabilities $P(e^-_t|G)$ where each probability represents the likelihood that evidence from a lower node is part of a learned temporal group $G_i$. A STL top node 400 comprises a spatial pooler 302 which produces a set of probabilities $P(e^-_t|S)$ 370 as described above with respect to FIG. 3.

The STL top node 400 further comprises a Supervised Mapper 460 which receives the set of $P(e^-_t|S)$. Based on the set of probabilities $P(e^-_t|S)$ 370 outputted over time by the spatial pooler 302, the supervised mapper 460 outputs a set of probabilities $P(e^-_t|C)$ 480, where $P(e^-_t|C)$ 480 represents the probability that $e^-$ (evidence from a lower level) belongs to a category of things C. Thus, each entry in the set of probabilities $P(e^-_t|C)$ 480 corresponds to a different category of objects C. The set of probabilities $P(e^-_t|C)$ 480 is used to assign a category C to a sensed input pattern based on the sensed input pattern with the highest probability $P(e^-_t|C)$ 480. In some embodiments, the Supervised Mapper 460 may alternatively output category C assigned to the sensed input pattern.

Spatio-Temporal Learning (STL) Networks

Figure 5:
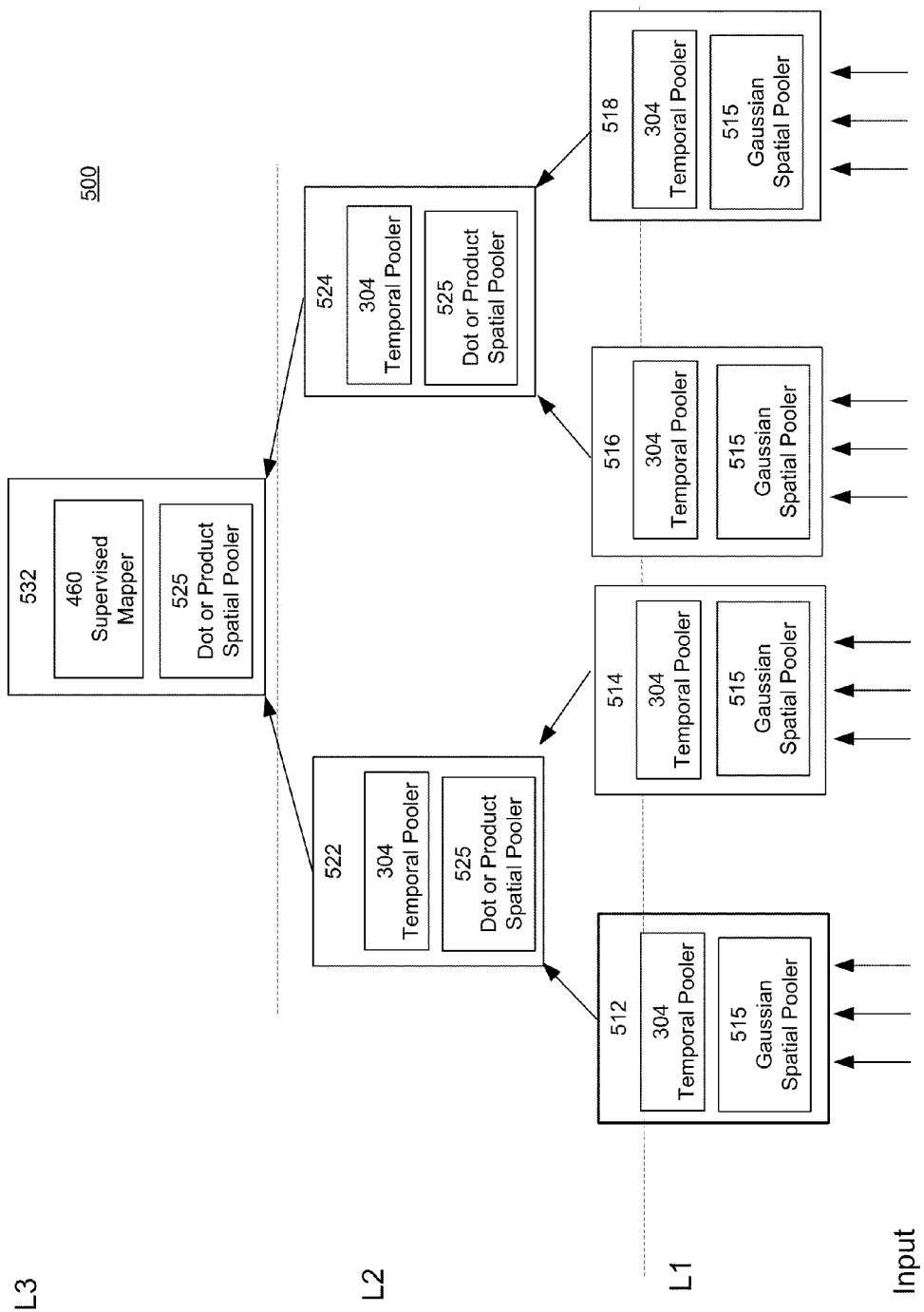
FIG. 5 shows a STL network in accordance with an embodiment of the present invention.

A Spatio-Temporal Learning (STL) network is a hierarchical network including a plurality of STL nodes 300 and a STL top node 400. According to the embodiment, a STL network may use different spatial and temporal group algorithms at different levels of the hierarchy. FIG. 5 illustrates a STL network 500 in which different temporal and spatial pooling algorithms are used at different levels.

In a first level L1 of the STL network 500, the STL nodes 512, 514, 516, 518 receive inputs from a data sensor. The data sensor partitions input data and distributes the input data to the first level L1 nodes. For example, in embodiments where the received input is picture, the data sensor may partition a picture into 4 equal parts and distribute them to the first level L1 nodes 512, 514, 516 and 518.

In the embodiment illustrated, the STL nodes in the STL network 500 execute different Spatial Pooler 302 algorithms at each level. In the first level L1, the STL nodes execute Gaussian Spatial Poolers 515 that are described in detail below. In the second level L2 nodes 522, 524 and STL top node 532, the nodes 522, 524, 532 execute Dot or Product Spatial Poolers 525 that are described in detail below. In other embodiments, STL nodes at different levels of a STL network 500 may execute different or additional spatial pooling algorithms such as Sparse Distributed Code Poolers that are described in detail below. In other embodiments, nodes at different levels of a STL network may execute different or additional temporal pooling algorithms. The STL top node further executes a Supervised Mapper 460 used to generate a probability that a sensed input belongs to a category of inputs.

Spatial Pooling

In STL nodes 300, the Spatial Poolers 302 function in both learning and inference. During learning, the Spatial Pooler 302 functions to identify common co-occurrences between patterns of inputs. According to the embodiment, these patterns of inputs may be represented in different ways, e.g., as input vectors. The Spatial Pooler 302 generates the set of probabilities $P(e^-_t|S)$ and transmits these either to a Temporal Pooler 304 or a Supervised Mapper 460.

According to the embodiment, the Spatial Pooler 302 can be implemented in a variety of ways. Four different spatial pooling algorithms for STL nodes 300, 400 are disclosed herein. These spatial pooling algorithms are referred to as the Gaussian, Dot, Product and Sparse Distributed Code Pooling algorithms. The optimal spatial pooling algorithm depends primarily on the nature of the input vectors. In one embodiment, Gaussian spatial pooling is optimally used for nodes that receive input directly from a sensor. In one embodiment, Dot or Product spatial pooling is optimally used for middle or top nodes that receive input from other STL nodes 300, 400. The Gaussian spatial pooling algorithm performs a form of vector quantization, which is useful for sensory input signals, whereas Dot/Product pooling does not. Sparse Distributed Code Poolers are used to learn canonical inputs or spatial co-occurrences from input patterns which may contain more than one independent canonical input. Sparse Distributed Code Poolers decompose the sensed input pattern received from a lower node into "sparse distributed codes" or spatial co-occurrences of independent canonical inputs.

The Gaussian spatial pooling algorithm performs a form of vector quantization, which is useful for sensory input signals, whereas Dot/Product pooling does not. In some embodiments, the Dot and Product algorithms process the distribution sent by each child STL Nodes by finding the index of the element which represents the "winning" temporal group.

In the learning stage, the Spatial Pooler 302 analyzes the stream of sensed input patterns in order to generate a spatial co-occurrence matrix. This spatial co-occurrence matrix represents the set of all possible input patterns as a relatively small, finite set of canonical input patterns. These canonical input patterns selected by the spatial pooler are referred to herein as "spatial co-occurrences" because they represent distinctive occurrences of input patterns from the node's children that tend to appear together far more often than would be expected by random chance.

The spatial co-occurrence matrix W, is a list of spatial co-occurrences. Each spatial co-occurrence is stored as a row $W_j$, and W contains one column for each element in the input pattern. In this embodiment, each node's input pattern is a row vector that is formed by concatenating together the output vectors of each of the node's children.

In one embodiment, the spatial co-occurrence matrix starts out empty. When the Spatial Pooler 302 selects a particular input vector to be a spatial co-occurrence, it simply appends this input vector to W as a new row. The Spatial Pooler 302 also counts the number of input vectors that are pooled with each of the spatial co-occurrences in the matrix in addition to its primary task of building a spatial co-occurrence matrix. These frequency counts are stored in a single vector called counts. Upon the completion of learning, this vector will contain one integer for each spatial co-occurrence in W. The value of the jth element is simply the total number of input vectors that were pooled with the jth spatial co-occurrence throughout the learning stage. The Spatial Pooler 302 does not use this frequency count information directly, but instead provides it to the Temporal Pooler 304.

In the inference stage, the Spatial Pooler 302 no longer updates the spatial co-occurrence matrix W, and instead compares each new input vector to the spatial co-occurrences in W. During inference, the Spatial Pooler 302 computes a "belief vector" y for its input vector x. This output vector is a distribution over spatial co-occurrences, so it contains one element for each row in W. The output vector y is handed off to the Temporal Pooler 304. In fact, the Spatial Pooler 302 can be thought of as a pre-processor for the Temporal Pooler 304. The Spatial Pooler 302 simplifies the inputs to the Temporal Pooler 304 by pooling the vast space of input vectors into a relatively small set of discrete spatial co-occurrences that are easier to handle. In this context, the term "belief" represents a generalized measure of the likelihood that a particular input vector x and a particular spatial co-occurrences w both represent the same underlying real-world world cause. Although this use of "belief" does not carry a precise mathematical meaning, a higher value in the belief vector implies a higher likelihood that the input vector and the corresponding spatial co-occurrences were produced by the same cause.

Gaussian Spatial Pooler Learning

The Gaussian Spatial Pooler 515 receives a stream of input vectors. For each received input vector, the Gaussian Spatial Pooler 515 identifies the particular input vector x as a new spatial co-occurrence if x is sufficiently dissimilar (by a Euclidean distance metric) to all of the spatial co-occurrences that the Gaussian Spatial Pooler 515 has previously identified. The Gaussian Spatial Pooler 515 uses a Euclidean distance metric to compare the input vectors presented during training. The squared Euclidean distance between an input vector x and an existing spatial co-occurrence w is computed as follows:

$$d^2(x,w) = \sum_{j=1}^{Ndims}(x_j - w_j)^2$$

The Gaussian Spatial Pooler 515 identifies new spatial co-occurrences based on a specified threshold distance value, maxDistance. If the squared distance between an input vector x and an existing spatial co-occurrence w is less than maxDistance, the input vector is not considered to be a new spatial co-occurrence and is pooled together with that existing spatial co-ccurrence. In this case, the frequency count of the existing spatial co-occurrence w in the counts vector is incremented by 1. If the input vector's squared distance to all existing spatial co-occurrences is greater than maxDistance is the input vector identified as a new spatial co-occurrence, in which case the Gaussian Spatial Pooler 515 appends the new spatial co-occurrence to W.

The Gaussian Spatial Pooler 515 algorithm is highly dependent on the value of maxDistance. The Gaussian Spatial Pooler 515 will identify more spatial co-occurrences when maxDistance is low. A high value of maxDistance will result in fewer spatial co-occurrences. If maxDistance is equal to 0, every unique input vector presented during training will be selected as a spatial co-occurrence.

Dot-Product Spatial Pooler Learning

The Dot or Product Spatial Poolers 525 operate in an identical manner during the learning stage and only differ in operation during the inference stage. In one embodiment of the STL nodes 300, 400, the outputs from the node's children are concatenated together into a single row vector representing an input pattern. The Dot/Product Spatial Pooler 525 tracks which elements of this concatenated vector came from which child in the STL network 500, using this information to make spatial pooling decisions. The Dot/Product Spatial Poolers 525 employ a winner-take-all approach to spatial pooling. When presented with a concatenated input vector x, the STL nodes 300, 400 divide this input vector into $N_{children}$ portions, where $N_{children}$ denotes the number of children feeding into the STL node 300, 400. Each of these portions contains the elements of x that were contributed by a particular child.

The elements in each portion represent a distribution over the temporal groups of a single child. Within each portion, the Dot/Product Spatial Pooler 525 locates the largest element and declares it the "winner". The Dot/Product Spatial Pooler 525 then updates this portion of x by setting the winning element's value to 1 and setting all the other elements in that portion to 0. The Dot/Product Spatial Pooler 525 performs this operation on each portion of the input vector. The result is an updated input vector containing $N_{children}$ elements with a value of 1, with all remaining elements set to 0. Each child's portion contains a single 1. After performing this operation on the concatenated input vector, the Dot/Product Spatial Pooler 525 inserts the updated input vector into the spatial co-occurrence matrix W if the vector is not already present in the matrix. After the node sees the entire set of training data, W will be a list of all unique input vectors as updated by the winner-take-all rule. As with the Gaussian Spatial Pooler 515, the Dot/Product Spatial Pooler 525 maintains a count of the number of input vectors that have been pooled with each spatial co-occurrence. If a particular input vector is found to match an existing spatial co-occurrence, the frequency count associated with that spatial co-occurrence is incremented.

The Dot/Product Spatial Pooler 525 requires no parameters. Despite the fact that the Dot/Product Spatial Pooler 525 stores as a spatial co-occurrence every unique input vector (subsequent to winner-take-all processing), the memory usage is not typically prohibitive in practice. Real-world data tends to have a great deal of causal structure; therefore, the number of unique spatial co-occurrences encountered each STL node 300, 400 is far lower than what would be expected if random inputs were presented to the network. In some embodiments the number of unique spatial co-occurrences encountered by a Zeta −1 node 300, 400 can still become large. In these embodiments, the Dot/Product Spatial Pooler 525 uses sparse matrices and other coding optimizations to reduce memory usage during the learning stage.

Spatial Pooler Inference

In inference mode, the Spatial Pooler 304 receives an input vector x and computes a new distribution vector y with one element for each spatial co-occurrence in the spatial co-occurrence matrix W. Each of these values $y_j$ represents the belief that the input x belongs to the spatial co-occurrence "bin" $W_j$. Note that a belief value generated by the Spatial Pooler 304 represents neither a true probability nor a mathematically rigorous likelihood. Instead, a belief value $y_j$ is best thought of as a generalized measure of "belief" that the input vector x was generated by the underlying cause associated with the spatial co-occurrence $W_j$ from the spatial co-occurrence matrix.

Gaussian Inference

The Gaussian Spatial Pooler 515 receives an input vector x, it first computes the Euclidean distance between x and each of the spatial co-occurrences in W. The Gaussian Spatial Pooler 515 then converts these distances to belief values using a Gaussian approach. The algorithm models the input vector x as a random sample drawn from one of $N_{coincs}$ Gaussian probability distributions. Each of these distributions is centered on a different spatial co-occurrence vector in W; the $N_{coincs}$ rows of W represent the mean vectors of the Gaussian distributions. The distributions all have an identical variance, which is uniform across all dimensions of the input space. This variance is the user-specified parameter sigma, also denoted as σ, which is defined as the square root of this uniform variance. The Gaussian Spatial Pooler 515 computes the belief that x was generated from the cause represented by the $j^{th}$ spatial co-occurrence as the local probability density of the $j^{th}$ Gaussian distribution, as measured at point x:

$$y_j = e^{-(x-W_j)^2/2\sigma^2}$$

If the sequence of input vectors was randomly drawn from a set of $N_{coincs}$ true Gaussian processes, then the belief $y_j$ calculated by the Gaussian Spatial Pooler 515 would be strictly proportional to the probability that the input vector x was drawn from the $j^{th}$ distribution. However, in most real applications, the sequence of input vectors cannot be accurately modeled by such processes. Nevertheless, this model provides an approximation, and produces an exponential decay of the belief in the $j^{th}$ cause with increasing distance between x and $W_j$. The aforementioned parameter sigma controls the rate at which the Gaussian probability distributions decay with distance. A low value of sigma will result in very small Gaussian "clouds" centered tightly around each spatial co-occurrence. Only the spatial co-occurrences that are highly similar to the input vector will receive non-infinitesimal belief values.

Dot/Product Inference

Spatial co-occurrence matrices generated by the Dot or Product Spatial Pooler 525 using the Dot and Product algorithms store input vectors updated using the winner-take-all approach. Each of these vectors has $N_{children}$ elements set to 1—one such element for each child node—and all other elements set to 0. When the Dot inference algorithm receives a concatenated input vector from its child nodes, it generates a belief value for each of its stored spatial co-occurrences using a dot product operation. The belief value $y_j$ associated with the $j^{th}$ spatial co-occurrence is simply the dot product of the $j^{th}$ (updated) spatial co-occurrence vector with the input vector:

Since a spatial co-occurrence vector defines a single "winning" element for each of its children, the input values for each of these winning elements are simply summed together to yield the belief value. The Dot Spatial Pooler 525 repeats this process for each of the spatial co-occurrences in W to produce the output vector y with $N_{coincs}$ elements. Because the dot product operation reduces to a summation, the Dot Spatial Pooler 525 provides flexibility in instances in which most of the inputs from a node's children match a particular spatial co-occurrence well, but one or two children are badly mismatched. In this case, the high input values of the matching child nodes will dominate the summation and tend to compensate for the low input values coming from the mismatched child nodes.

The Product Spatial Pooler 525 inference algorithm is very similar to the Dot algorithm. When the Dot Spatial Pooler 525 computes a belief value, it sums the support from each of its children. By contrast, the Product Spatial Pooler 525 multiplies the support. This simple distinction generates to very different belief vectors. Consider a node with 10 children. If the node uses the Dot Spatial Pooler 525, a spatial co-occurrence that matches well with the input vectors from nine of the ten children but is dissimilar to the input from the tenth child will still receive a very high belief value. But if the node uses the Product Spatial Pooler 525, the tenth child can "veto" the spatial co-occurrence by zeroing out the overall belief value. Accordingly, the Product Spatial Pooler 525 algorithm thus requires strong consensus among the children to produce a non-infinitesimal belief value.

Sparse Distributed Code Pooler Learning and Inference

Sparse Distributed Code Poolers are a fourth type of Spatial Pooler 302. In some embodiments, a STL network may be composed entirely of STL nodes 300, 400 which Sparse Distributed Code Poolers as their Spatial Pooler 302. In other embodiments, only lower level or higher level nodes use Sparse Distributed Code Poolers as their Spatial Pooler 302.

Sparse Distributed Code Poolers decompose a set of received input patterns into a set of spatial co-occurrences representing "sparse distributed codes". Sparse distributed codes are components of an input pattern which are independent and thought to have the same cause. The components in the set of sparse distributed codes are "sparse", meaning that Sparse Distributed Code Pooler learns only the minimal number of independent components that can be used to represent the sensed input patterns. According to the embodiment different variations of known sparse distributed code learning algorithms can be used to identify the optimal independent components within the sensed input patterns. These algorithms can include Fouldeac learning algorithms or any other type of Hebbian learning algorithms. Other sparse distributed code learning algorithms will be well known to those skilled in the art.

Sparse Distributed Code Poolers are well suited for use as Spatial Poolers 302 in HTM networks as they are unsupervised learning algorithms. In these algorithms, the Sparse Distributed Code Pooler learns the set of spatial co-occurrences or "sparse distributed codes" by iteratively reweighting an initial set of components. Once these components have been identified, the Sparse Distributed Code Pooler can either switch into inference mode in which the Sparse Distributed Code Pooler determines a set of probabilities $P(e^-_t|y)$, where each probability indicates the likelihood that each sparse distributed code y represents the newly sensed input pattern. Alternatively, the Sparse Distributed Code Pooler can continue to both determine the set of probabilities $P(e^-_t|y)$ for each newly received input pattern while continuing to iteratively re-weight and update the set of sparse distributed codes. In this way the processes of learning and inference are not exclusive or distinct in the Sparse Distributed Code Pooler.

Group Based Temporal Pooler Learning

Figure 6:
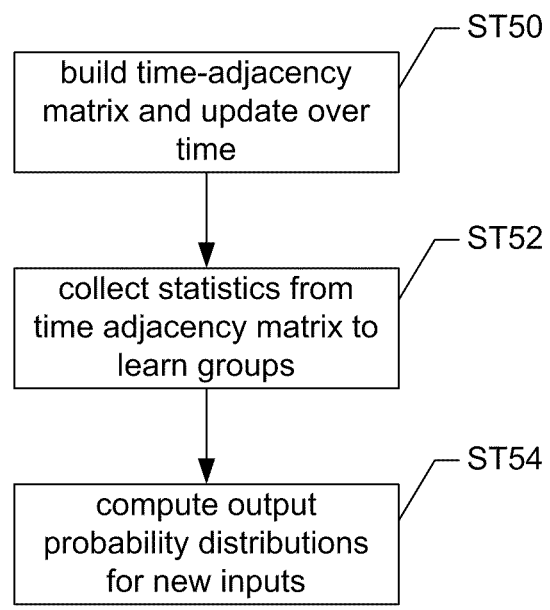
FIG. 6 shows a flow process in accordance with an embodiment of the present invention.

As illustrated in FIG. 6, the Temporal Pooler 304 learns groups and builds a time-adjacency matrix which is updated over time ST50. Further, the group learner is arranged to collect statistics from the time-adjacency matrix to learn temporal groups ST52 and then, based on its learned groups and statistics thereof, compute probability distributions for new inputs (as described above) ST54.

Figure 7:
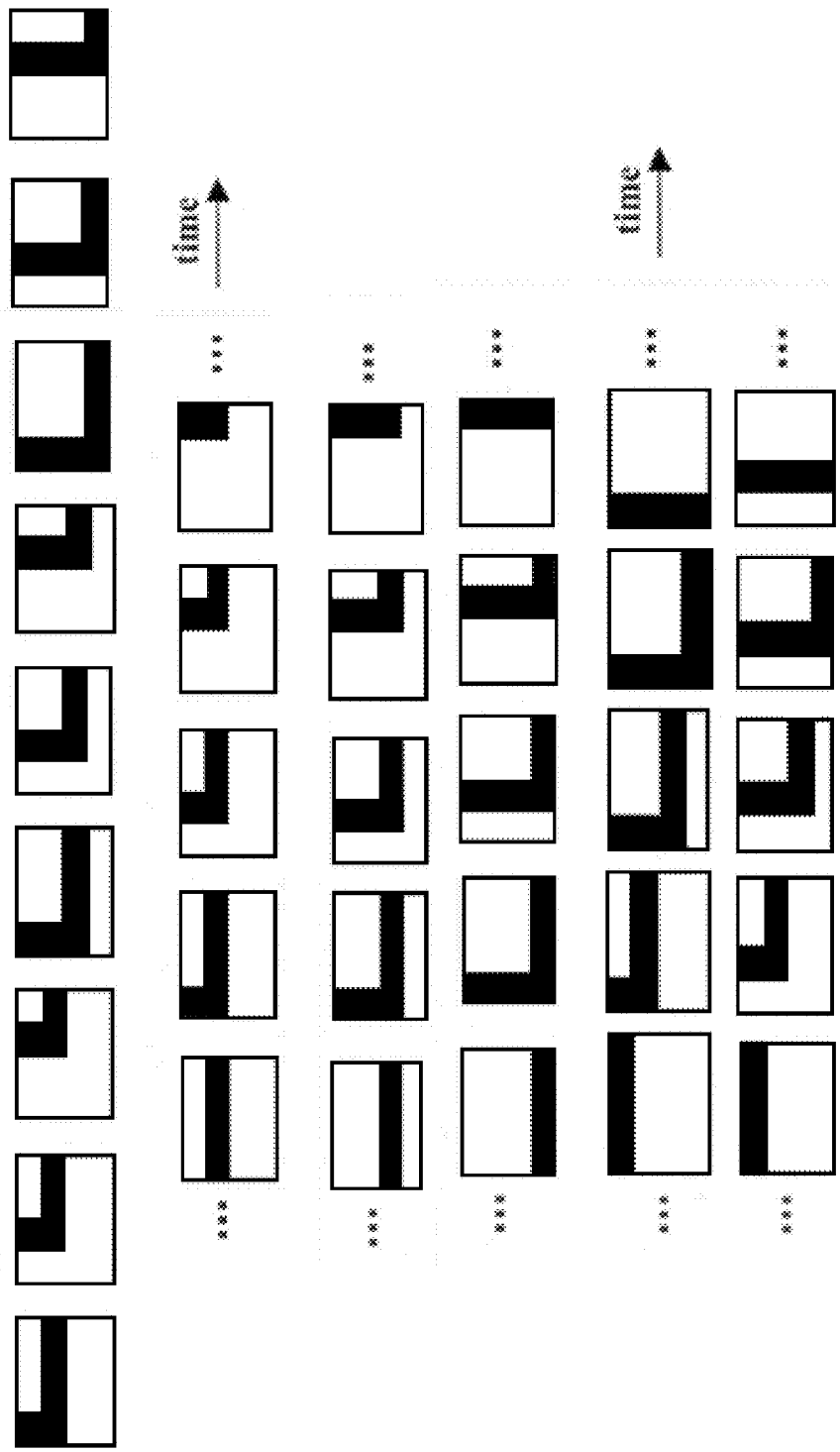
FIG. 7 shows an illustration of temporal perception.

FIG. 7 illustrates an example of sensing or perceiving a right corner moving in and out of vision. Although the individual sequences of input patterns may represent the same input of a right corner, the sequences of viewing the corner moving into view may be interspersed over time. Additionally, not all of the sequences of patterns representing the right corner are comprised of the exact same image or pattern but instead patterns which represent the same cause.

As discussed above, one limitation of temporal pooling based strictly on sequential patterns is that this technique often causes a large number of sequences to be created and grouped. When inputs or patterns of inputs with the same cause are sensed in real life, it is not always the case that they adhere to the same sequence every time. Random noise and variety in the order which inputs or patterns are sensed can create a large number of sequences of events, which all have the same cause. Due to different orders in which inputs can be sensed, a large number of patterns which have the same cause can create a combinatorial explosion when considering all possible sequences the patterns can form. Enumerating all of the possible different sequences is not only computationally expensive but often inaccurately reflects the frequency with which patterns co-occur. Promiscuous sequences can sometimes lead to an even or "flat" distribution in frequencies of temporal adjacencies. This "flat" distribution can occlude the detection of differences in frequency of temporal adjacency due to a common cause.

Group based temporal pooling addresses these problems in temporal and spatial pooling by identifying groups of input patterns thought to have the same cause by identifying temporally temporal adjacency between inputs without relying on the sequence of occurrence of these inputs. Temporal adjacency is used herein to refer to two input patterns occurring at the exact same time as well as close in time point to each other such as directly before or after each other (temporally adjacent) or close to each other in a sequence of inputs over time (temporally proximal). In temporal adjacency, the order in which the input patterns occur can be symmetrical or asymmetrical. In other words, the identified temporal adjacency values may be based or the order the inputs occur (e.g. A..B is not equivalent to B..A) or independent of the order the input occur (i.e. A..B is equivalent to B..A). In most embodiments, the groups identified by group based temporal pooling are unordered, meaning that there is no inherent structure or sequence in which the input patterns occur within the group. However, in alternate embodiments, the input patterns may be partially ordered in a group based on various criteria such as frequency of occurrence.

In one embodiment, temporal adjacency is enumerated for each of the input patterns in a time-adjacency matrix. Each row in the time adjacency matrix represents a sensed input pattern for a time point. Each column in the time adjacency matrix also represents a sensed input pattern. The matrix is enumerated to reflect the frequency of temporal adjacency. At each time point t, the matrix is updated at the row corresponding to the input at time t and the column corresponding to the input that occurred at the previous time point $W_{t-1}$. According to the embodiment of the present invention, the matrix is also updated at several previous time points. The number of time points can range from 1 to n, where n represents all previous all time points used to update the matrix. According to the embodiment, n may be parameterized or take a default value. The matrix may be updated with an integer number which enumerates the number of times the input at time t and the input at time $W_{t-1}$ are temporally adjacent, or any alternative numeric variable to represent the frequency of temporal adjacency. Additionally, alternate data structures may be used to score temporal adjacency. Various combinations of data structures and numeric variables to enumerate frequency will be apparent to those skilled in the art.

Figure 8A:
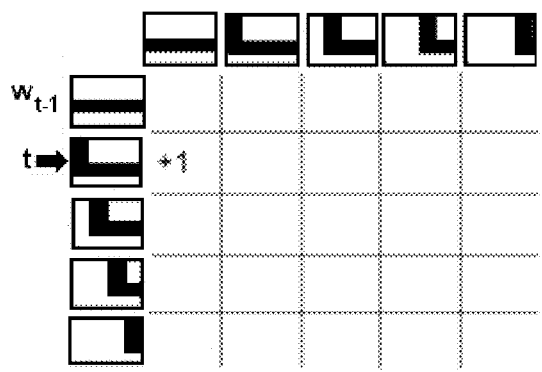
FIGS. 8(a)-8(d) illustrate four consecutive updates of a time adjacency matrix in accordance with an embodiment of the present invention.
Figure 8B:
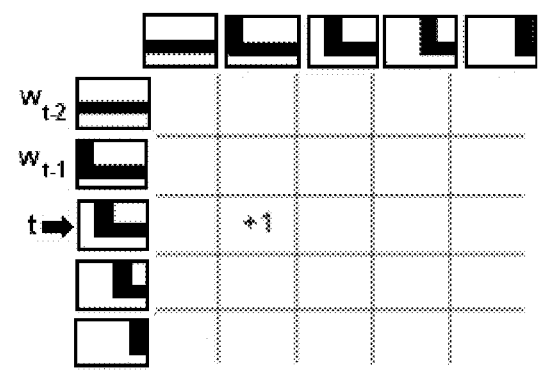
Figure 8C:
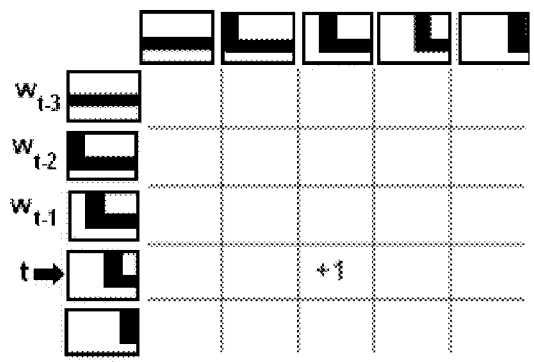
Figure 8D:
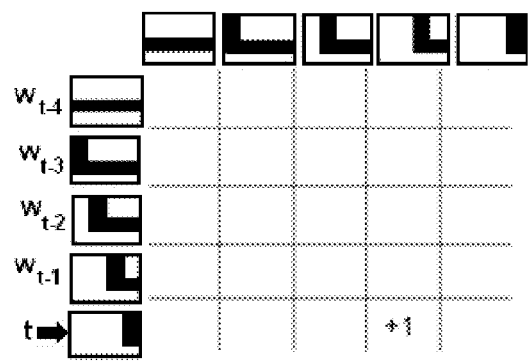

Four consecutive updates of a time adjacency matrix are illustrated in FIGS. 8(a)-(d). In FIG. 8(a) the row corresponding to the pattern at time t is updated at the column corresponding to the pattern at time $W_{t-1}$ to add an integer value of 1. The increment of +1 represents an update to a value representing the frequency of temporally adjacency of the two patterns. In FIG. 6(b), the time point is advanced such that the previous times t and $W_{t-1}$, are now respectively $W_{t-1}$ and $W_{t-2}$. The matrix is again updated at the column corresponding to the pattern of $W_{t-1}$, and the row corresponding to the pattern of time t. FIGS. 8(c) and 8(d) illustrate two additional consecutive updates of the time-adjacency matrix.

In embodiments where the matrix is updated for temporal adjacency up to $W_{t-n}$ where n>1, a decay function can be used to weight the enumeration of temporal adjacency. The decay functions may be linear in proportion to n, which represents the number of time points between t and $K_{t-n}$. Alternatively, the decay function may be exponential or pseudo-exponential over time. Examples of suitable decay functions to weight temporal adjacency by proximity include but are not limited to: persistence decay functions, block decay functions and exponential decay functions. According to the embodiment, the decay function may be adjusted to weight temporally proximal patterns with a greater or lesser weight. Those skilled in the art will understand the utility of adjusting the decay function according to the application of group-based temporal pooling and the type of input data which pooling is applied to.

Figure 9A:
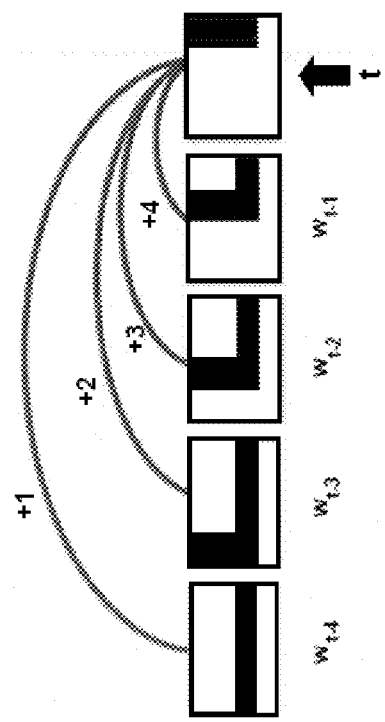
FIG. 9(a) illustrates a decay function in accordance with an embodiment of the present invention.
Figure 9B:
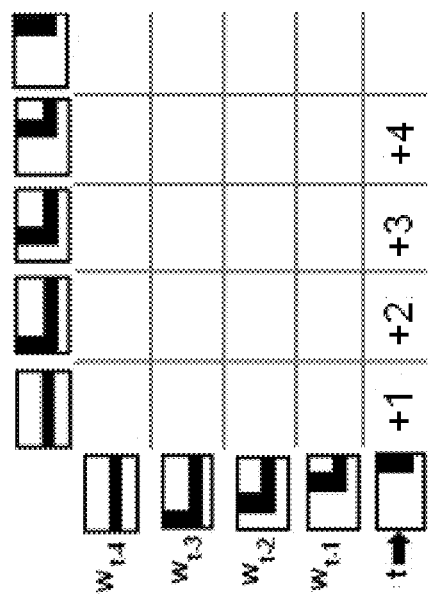
FIG. 9(b) illustrates an update of the time-adjacency matrix using a decay-function in accordance with an embodiment of the present invention.

FIGS. 9(a) and 9(b) illustrate a linear decay function using the integer based enumeration shown in FIGS. 8(a)-(d). FIG. 9(a) illustrates a decay function which is linearly proportional to n, where n equals 4. In FIG. 9(a), the maximum number used to enumerate the temporal adjacency is 4 for $W_{t-1}$. Each pattern at the previous time points ($W_{t-2}$, $W_{t-3}$, $K_{t-4}$) is assigned an integer value which reflects its temporal distance relative to the pattern at time t. In the example illustrated, the linear decay function subtracts one integer value for every time point between the enumerated pattern and the pattern at time t. FIG. 9(b) illustrates one update of the time adjacency matrix using the decay function. In FIG. 9(b), the row representing the pattern at time t is updated at the columns representing patterns at $W_{t-1}$, $W_{t-2}$, $W_{t-3}$ and $W_{t-4}$ with values 4, 3, 2 and 1, respectively.

In addition to temporal proximity, the enumeration of the time adjacency matrix is also weighted to reflect spatial proximity of the patterns in some embodiments. In systems where a large number of potential patterns may exist, it may be necessary to represent new patterns using a set of quantization points or by defining a threshold on the number of input patterns to include in the time-adjacency matrix. As discussed above, quantization points may be determined based upon frequency of occurrence. Quantization points may also be determined using standard machine learning techniques such as principle components analysis. Alternatively, quantization points may be determined using other unsupervised learning methods such as Gaussian clustering. According to the embodiment, the number of quantization points may be parameterized by specifying the number of input patterns to include in the time-adjacency matrix.

Similarity to existing patterns or quantization points may be determined in a number of ways using conventional methods. In some embodiments, each pattern may be assigned a set of features and similarity may be determined between two patterns using a variety of distance functions. The set of features and distance functions may be specific to the type of pattern used and the application of the pooled groups. For example, patterns comprised of images may be compared using distance functions based on image-based features such as pixel color, luminescence, etc. Patterns comprised of sequences may be compared using distance functions including mismatch values and gapped alignments. Additional similarity metrics and distance functions will be readily apparent to those skilled in the art in light of this disclosure.

In situations where a new input has a large amount of similarity to more than one existing inputs, the new pattern may be assigned to multiple different existing inputs to represent spatial proximity. Multiple assignment of new inputs is used to enumerate several existing patterns based one new input, instead of creating a new row in the time-adjacency matrix representing every input not previously sensed by the system. According to the embodiment and similarity, the temporal adjacency enumeration value may be multiply divided over several images in any suitable method. If similarity is probabilistically determined using machine learning methods, multiple assignment may correspond to the probability the two images are the same. Alternately, multiple assignment may be based on one or more similarity values.

Figure 10A:
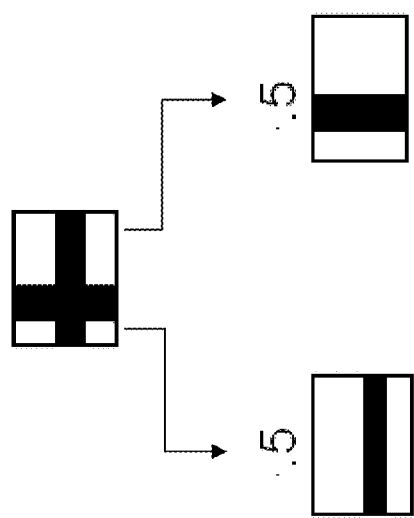
FIG. 10(a) illustrates a multiple assignment of a sensed input in accordance with an embodiment of the present invention.
Figure 10B:
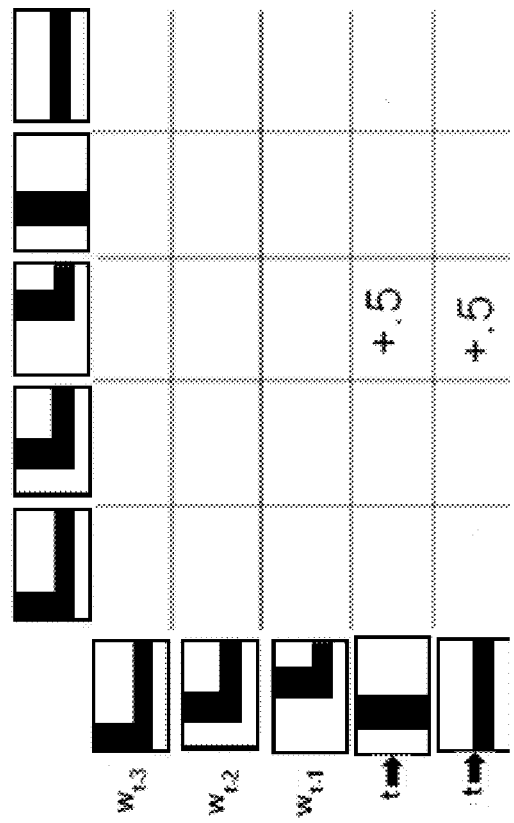
FIG. 10(b) illustrates an update of the time-adjacency matrix using multiple assignment of a sensed input in accordance with an embodiment of the present invention.

The concept of multiple assignment is illustrated in FIG. 10(a). In this illustration, the image of the intersection of perpendicular horizontal and vertical lines has both high similarity to the images of the horizontal line and the image of the vertical line. Both the images of the horizontal line and the vertical line are assigned a value of ½ or 0.5 of a temporal adjacency enumeration value of 1. In FIG. 10(b), the rows corresponding to both the horizontal line image and the vertical line image are updated at time t at the column corresponding to the image of time $W_{t-1}$.

Figure 11B:
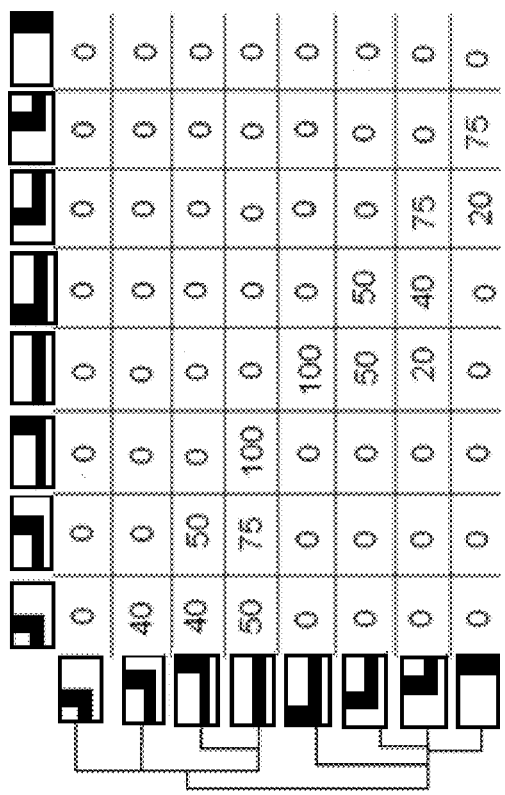
FIG. 11(b) illustrates a clustering of a time-adjacency matrix of FIG. 11(a) in accordance with an embodiment of the present invention.
Figure 11A:
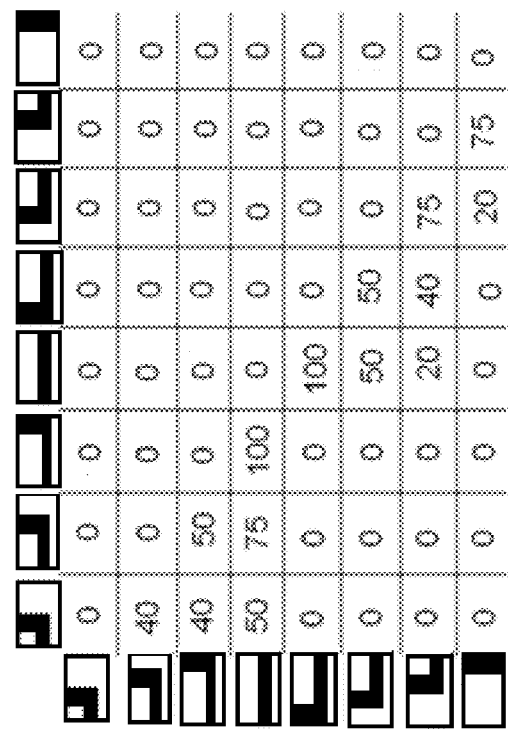
FIG. 11(a) illustrates a time-adjacency matrix.

Once the time-adjacency matrix is fully updated, the groups of sensed input patterns are identified. FIG. 11(a) illustrates a simple example of a complete time-adjacency matrix with two distinct groups of input patterns, a set of right corners and a set of left corners. Upon inspection of the time-adjacency matrix it is clear that the two groups distinctly co-occur with each other only (there are never any left corners in the columns enumerated for the right corners) and are separate entities. The only pattern (i.e. image) that has overlap between the two groups is that of the straight line, which temporally co-occurs or is adjacent to both the left corner and the right corners. If the pattern representing the straight line is removed from the time adjacency matrix, the right corners and left corners would form two separate and distinct groups.

In one embodiment, these groups are identified using hierarchical agglomerative clustering or any method of "hard" clustering wherein each row of the time-adjacency matrix is assigned to only one cluster or group. In one embodiment, the clustering algorithm may learn a number of clusters reflective of the natural groups of input patterns. Alternatively, the clustering algorithm may take a number of clusters to form as a parameter. The identification of the two groups of input patterns through clustering is illustrated in FIG. 11(b). Suitable clustering methods include single linkage clustering and n-means clustering. In this type of clustering, the temporal adjacencies enumerated in each row of the matrix form the set of values used to pair-wise similarities between the two input patterns. Any type of distance metric can be employed to determine the pair-wise similarities which are then used to cluster or group the rows representing the input patterns.

In some embodiments, the groups are identified though a method which employs a greedy graph traversal to identify cliques or groups of co-occurring patterns. This method relies on the principle of graph connectivity to identify and remove patterns which have overlap between multiple groups. This concept is illustrated in FIGS. 12(a)-(c). FIG. 12(a) depicts a graphic illustration of a time adjacency matrix wherein each pattern is represented by a node in the graph and each edge between the nodes in the graph indicates temporal adjacencies between the two patterns. In FIG. 10(b), the two center nodes are identified as a distinct group of having high connectivity to other nodes. Each node is connected to four other nodes, causing both of the center nodes have a high sum of temporal adjacency values due to increased connectivity. However, the two center nodes have low temporal adjacency values with the other nodes, having the largest temporal adjacency value with each other. In FIG. 12(c) the identified group of center nodes (Group 0) is removed from the graph, forming two other distinct sub-graphs representing the remaining groups (Group 1 and 2).

This method of identifying groups based on the time-adjacency matrix works well because there are several patterns which will be over-represented or sensed more frequently than others, leading to both higher connectivity and also higher likelihood of connectivity (i.e. a high number of temporal adjacencies) with input patterns in multiple groups. Since the rows representing these frequently sensed patterns will be enumerated at each time point, the row representing pattern will have a large value when summed. The inequity in frequency of different patterns produces an uneven distribution over the sum of the rows of the matrix. The sum of the rows of the matrix can then serve as an indicator of the relative frequency of temporal adjacency or "connectivity" of each pattern. This concept is also illustrated in FIG. 11(a) by the straight line having the highest frequency of occurrence while not having the same cause as the right corners or the left corners. In FIG. 12(d) each rows of the matrix in FIG. 11(a) is summed, indicating that the straight line has both the highest temporal connectivity with each other pattern corresponding to its temporal adjacency with multiple groups.

In one embodiment of the present invention, a greedy algorithm is used to identify groups based on the above discussed connectivity as an indicator of group overlap. The greedy algorithm works by the principle of identifying for each sensed input pattern the nearest neighbors, that is, the sensed input patterns which have the highest frequency of temporal adjacency based on the time-adjacency matrix. In this embodiment, the group is defined as the smallest set of elements in which every element's closest topN neighbors are in the group. The topN neighbors are the highest N neighbors according to the sorted rankings representing temporal adjacency, where N is a numeric value. According to the specific embodiment, the greedy algorithm may be parameterized to allow the user to specify the N number of nearest neighbors of each element to be contained in each group. In one or more embodiments, the topN parameter may have as default value of 1.

Other parameters to allow the user to control the greedy algorithm include maxGroupSize and minGroupSize. maxGroupSize allows the user to specify a maximum number of elements in a group and provides the user the ability to ensure that not all elements will be grouped into one group. minGroupSize allows the user to specify a minimum number of elements to be contained within each group, thereby allowing the user to control spurious small groups. These parameters are specific to the embodiment discussed, but those skilled in the art will note the utility of using other constraints on group size and connectivity in light of this disclosure.

Figure 13:
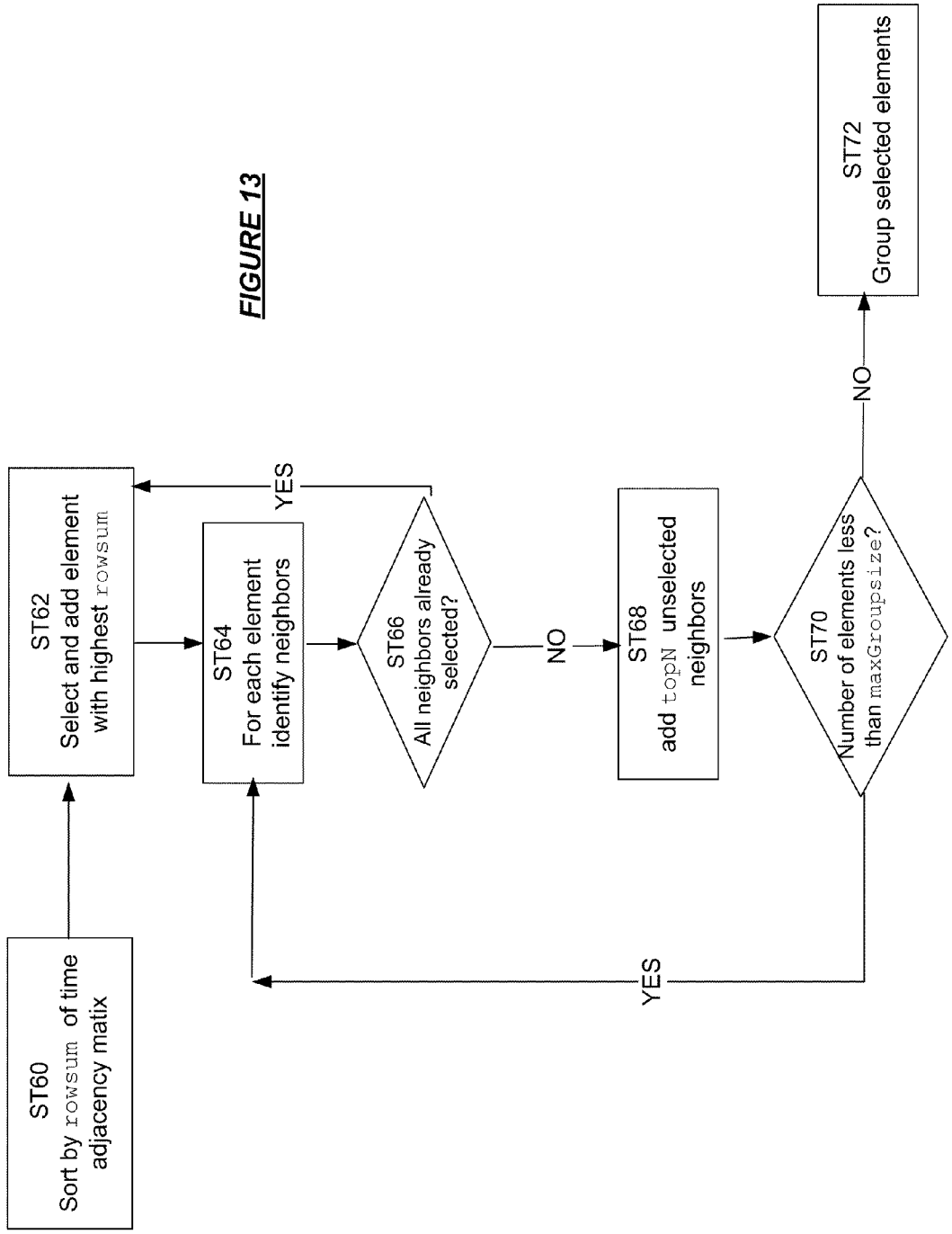
FIG. 13 shows a flow process in accordance with an embodiment of the present invention.
Figure 14:
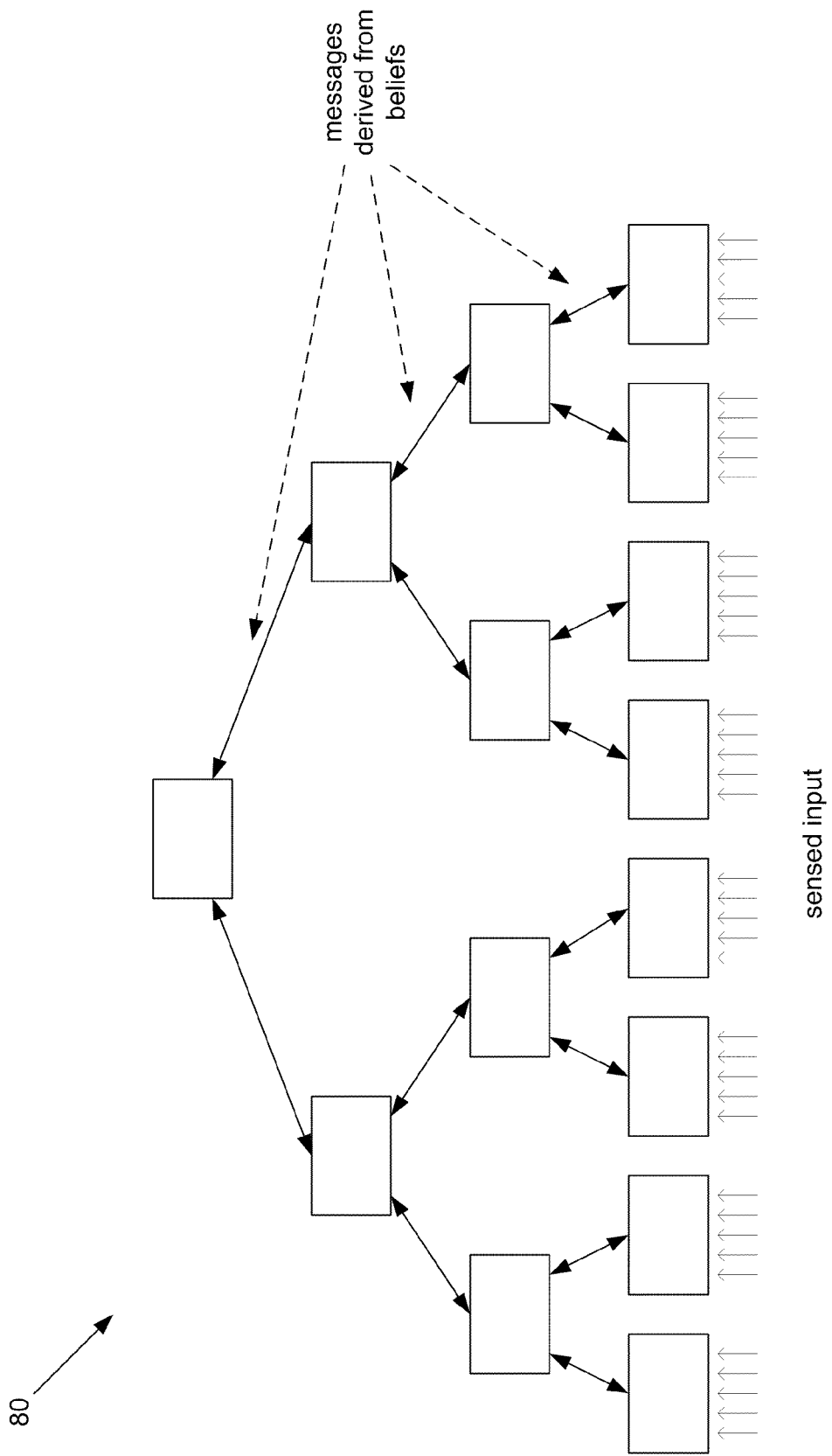
FIG. 14 shows at least a portion of a HTM-based system in accordance with an embodiment of the present invention.

FIG. 13 illustrates a flow control of the greedy algorithm according to one embodiment. Initially, the time-adjacency matrix is sorted by rowSum values in order to rank the rows representing different inputs according to their frequency of occurrence ST60. The element with the highest rowSum is selected and added to the group ST62. The neighbors of the first selected element are identified in the time adjacency matrix by determining which elements correspond to enumerated columns with in the row of the selected element ST64. The identified neighbors are checked to determine if all of the neighbors have already been selected ST66. If not, the identified neighbors are then sorted according the numeric value in of their corresponding columns in the time-adjacency metric which represents the temporal adjacency of the each neighbor relative to the first selected element. A number of elements equal to the lesser of the number of neighbors remaining unselected or the topN neighbors is then selected for addition to the group ST68. If the number of elements in the group after addition is less than maxGroupsize the method is repeated with all the elements of the group ST70.

In one embodiment, a tie breaking heuristic is used to determine which element to add to the group. In one embodiment, the original ranking of rowSum is used to determine the element with the highest frequency of occurrence of the two elements and add it to the group. For example, if the value of topN is 3 and the respective values of the top 4 neighbors are {9,8,4,4} then the neighbor with the value 4 with the higher rowSum is added.

If all of the neighbors of the elements are already selected, the unselected element with the highest rowSum is selected ST62, it's neighbors are identified ST64, and subsequent steps may be repeated until all of the unselected elements have been selected and grouped. This process of forming a group as outlined in FIG. 11 is performed until all the elements form a part of a group.

In alternate embodiments, additional parameters such as minGroupSize may be defined and utilized by the greedy algorithm to ensure a minimum number of elements in each group.

Temporal Pooler Inference

During inference, the Temporal Pooler 304 receives a belief vector y representing the set of probabilities $P(e^-_t|y)$ over the set of spatial co-occurrences from the Spatial Pooler 302. The temporal pooler uses its groups and matrix of weights to calculate a distribution over groups $P(e^-_t|G)$ which becomes the output of the node itself.

Supervised Mapper Learning and Inference

In a STL top node 400, a Supervised Mapper 460 receives Spatial Pooler 302 as input. During supervised learning, the Supervised Mapper 460 receives the index of a winning spatial co-occurrence from the Spatial Pooler 302 in conjunction with a category label. During inference, it receives the belief vector y representing the set of probabilities $P(e^-_t|y)$ over the set of spatial co-occurrences. The output of the Supervised Mapper 460 during inference is a distribution over categories $P(e^-_t|C)$. The Supervised Mapper 460 produces no output during learning.

During supervised learning, the Supervised Mapper 460 forms a matrix with $N_{coincs}$ rows and one column for each category C it receives as input. The Supervised Mapper 460 retrieves an index for the received category C on each iteration and increments the corresponding value in its mapping matrix. During inference, the mapper receives the belief vector y from the Spatial Pooler 302, and it produces a distribution over categories $P(e^-_t|C)$, which are the output of the node.

Belief Propagation

After an HTM has learned, one or more causes in its world, the HTM may determine causes of novel input using what may be referred to as "inference." In general, presented with novel sensed input data, an HTM may infer which of its learned causes is/are the source of the novel sensed input data based on statistical comparisons of learned groups and patterns with patterns in the novel sensed input data.

one or more embodiments, a cause is determined based on a single sensed input. An HTM node receives the newly sensed input, the HTM node assigns probabilities as to the likelihood that the new sensed input matches each of its learned sensed input groups. Then, as described above, the distribution over the set of groups learned by the HTM node is passed to a higher level node.

Note that the distribution passed by an HTM node is derived from a "belief" as to the likelihood that each learned cause is the cause of sensed input patterns at the input of the HTM node. A "belief" also includes those messages that are derived from or based on the belief. For example, an HTM node having learned five causes may deterministically assign scores that represent the probability that each of the five learned causes is the cause of sensed input. In one embodiment, the inputs are not exclusively associated with a single cause. Therefore, in some instances one or more scores indicating the probability that learned causes are the cause of the sensed input could equal 1 or a corresponding score which indicates a high likelihood that the learned cause is the cause of the sensed inputs. These scores (or "beliefs" as described above) may be normalized (or un-normalized) and passed to a parent node.

The parent node may then determine temporal adjacencies among the distributions sent from its child nodes, and then, based on its learned sensed input patterns and groups thereof, pass to a yet higher level node its own belief as to the likelihood that each of its learned causes is the cause of sensed groups at its input. In other words, a parent node forms its own "higher level" belief as to the cause of the sensed input patterns at least partly based on some statistical convergence of the beliefs passed from its child nodes.

Further, in one or more embodiments of the present invention, one or more prior probabilities may be set manually in addition to or instead of having prior probabilities set via prediction. In other words, an HTM may be manually controlled to anticipate a particular cause or set of causes.

As described above, in one or more embodiments of the present invention, inferring causes of sensed input patterns involves passing beliefs from lower level nodes to higher level nodes. In FIG. 12, such "belief propagation" is shown in HTM 80 (beliefs indicated with arrows; nodes shown, but not labeled). Generally, as described above, a belief is a vector of values, where each value represents a different cause. A current belief of a node may be a distribution of several causes being at least partially active at the same time. Further, the values in the belief vector may be normalized so that a stronger likelihood of one cause represented in the vector will diminish the likelihood of other causes represented in the vector. Further, note that a meaning of a value representing a cause in a belief vector may not vary depending on what other causes represented in the belief vector are active.

As described above with reference to FIGS. 2 and 5, a Zeta −1 network is a hierarchy of connected nodes. Each node may be thought as having a belief. In one or more embodiments of the present invention, a belief at one node may influence a belief at another node dependent on, for example, whether the nodes are connected via a conditional probability table (CPT).

A CPT is a matrix of numbers, where each column of the matrix corresponds to the individual beliefs from one node, and where each row of the matrix corresponds to the individual beliefs from another node. Thus, note that by multiplying a vector representing a belief in a source node by an appropriate CPT results in a vector in the dimension and "language" of beliefs of a destination node. For example, in an HTM-based system designed for operation in a "weather" domain, a lower level node may form a belief about air temperature and have values representing the likelihood of the following causes: "hot"; "warm"; "mild"; "cold"; and "freezing". A higher level node may form a belief about precipitation and have values representing the likelihood of the following causes: "sunny"; "rain"; "sleet"; and "snow". Thus, using a CPT, the belief about air temperature in the lower level node may inform the belief about precipitation in the higher level node (and vice-versa). In other words, multiplying the vector representing the belief about air temperature in the lower level node by the CPT results in a vector representing the appropriate belief about precipitation in the higher level node.

Accordingly, in one or more embodiments of the present invention, belief propagation allows an HTM to infer causes such that each node in the HTM represents a belief that is maximally or optimally consistent with its input. Note that performing inference in such a manner results in ambiguities being resolved as beliefs ascend through the HTM. For example, in an HTM (or part thereof) having a parent node and two child nodes, if (i) the first child node believes with 80% certainty that it is seeing a "dog" and with 20% certainty that it is seeing a "cat" and (ii) the second child=node believes with 80% certainty that it is hearing a "pig" and with 20% certainty that it is hearing a "cat," then the parent node may decide with relatively high certainty that a "cat" is present and not a "dog" or "pig." The parent node effectively settled on "cat" because this belief is the only one that is consistent with its inputs, despite the fact the "cat" image and the "cat" sound were not the most likely beliefs of its child nodes.

Further, as described above, a higher level node in an HTM may pass a "prediction" to a lower level node in the HTM. The "prediction" is a "belief" in that it contains values representing the likelihoods of different causes. The vector representing the belief in the higher level node may be multiplied by an appropriate CPT to inform a belief in the lower level node. Thus, in effect, a higher level node in an HTM uses its learned sequences combined with recent state information (i.e., the current input to the higher level node) to (i) predict what its next belief should be and (ii) then pass the expectation down to one or more lower level nodes in the HTM.

Figure 15:
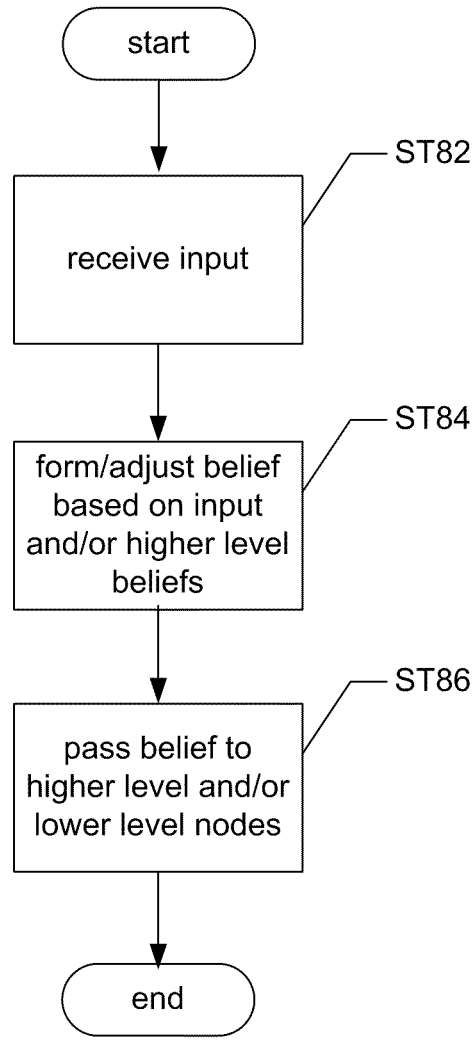
FIG. 15 shows a flow process in accordance with an embodiment of the present invention.

FIG. 15 shows a flow process in accordance with an embodiment of the present invention. Particularly, FIG. 15 shows in summary the steps of belief propagation described above. Initially, a current node in the HTM receives input (in the form of sensed input patterns or beliefs from lower level nodes) ST82. Based on the received input and any beliefs passed down from a higher level node, the current node forms/adjusts its belief as to the likelihood of causes at its input distributed over its learned causes ST84. This belief is then passed to higher level and/or lower level nodes to inform beliefs at those nodes ST86.

Architecture

Figure 16:
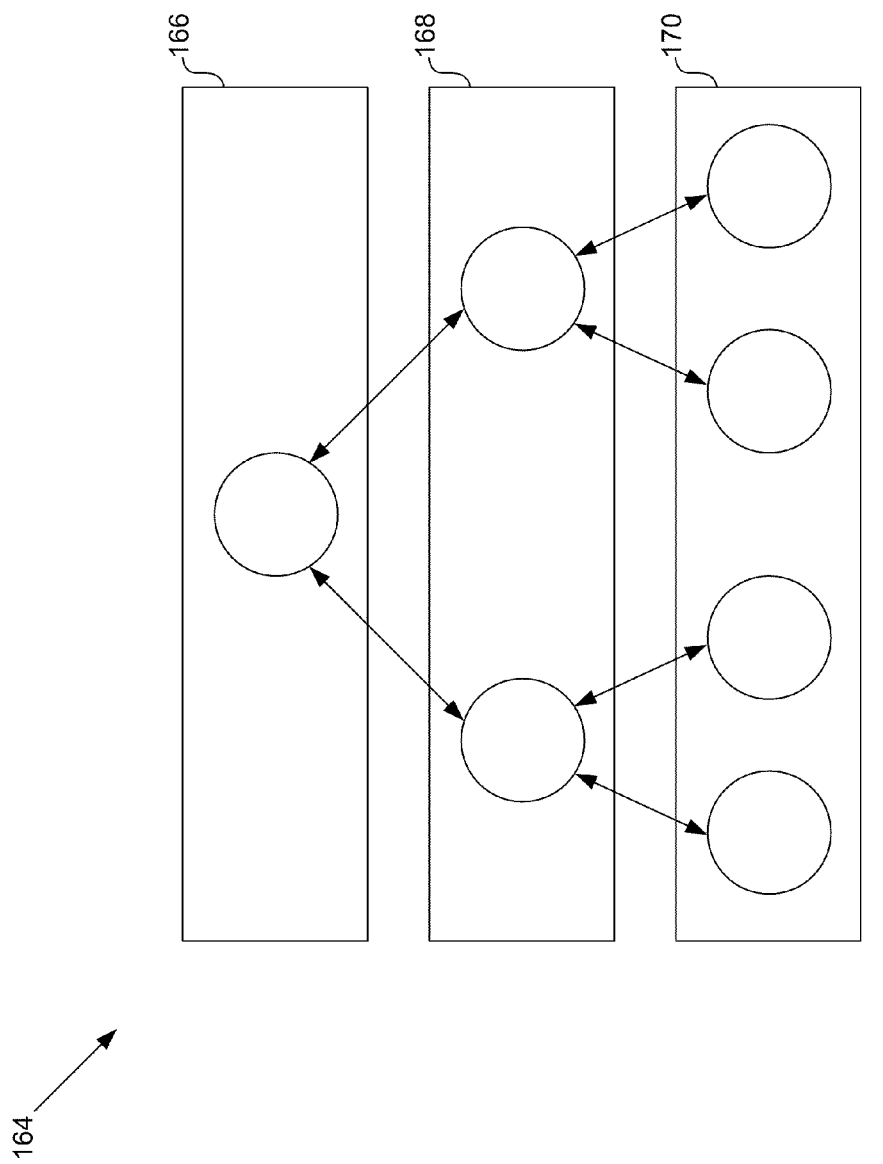
FIG. 16 shows at least a portion of a HTM-based system in accordance with an embodiment of the present invention.

In one or more embodiments of the present invention, at least part of an HTM network may be provided as a software platform. As shown in FIG. 16, in one or more embodiments of the present invention, an HTM network (nodes shown, but not labeled) 164 may run across several CPUs 166, 168, 170. The CPUs 166, 168, 170 may either be part of a single system (e.g., a single server) or multiple systems. For example, an HTM network may be created in software across several multiprocessor servers, where such a group of servers may be referred to as a "cluster." The servers in a cluster may be heterogeneous, i.e., the servers may have differing configurations/specifications (e.g., clock speeds, memory size, number of processors per server). Further, the servers may be connected via Ethernet or one or more other networking protocols such as, for example, Infiniband, Myrinet, or over a memory bus. Further, the servers may run any operating system (OS) (e.g., Windows, Linux). In general, each of the servers in a cluster may be responsible for running some portion of an HTM network. The portion of the HTM network dedicated to each server may vary from server to server depending on, for example, the configuration/specification of each server.

Further, in one or more embodiments of the present invention, the CPUs over which an HTM network runs may be located at a single location (e.g., at a datacenter) or at locations remote from one another.

As described above, in one or more embodiments of the present invention, at least part of an HTM network may be provided as a software platform. The software executables for creating and running the HTM network may be referred to as being part of a "runtime engine." As shown in FIG. 15, a runtime engine 172 of an HTM-based system includes, in addition to the executables for running an HTM network 174, a Supervisor entity 176. In one or more embodiments of the present invention, the Supervisor entity 176 is responsible for, among other things, starting and stopping the HTM network 174 and communicating with external applications (i.e., "tools") 180, 182, 184, each of which are further described below. However, although the Supervisor entity 176 may be used to start and stop the HTM network 174, it may not be necessary for the Supervisor entity 176 to be running while the HTM network 174 is in operation.

Figure 17:
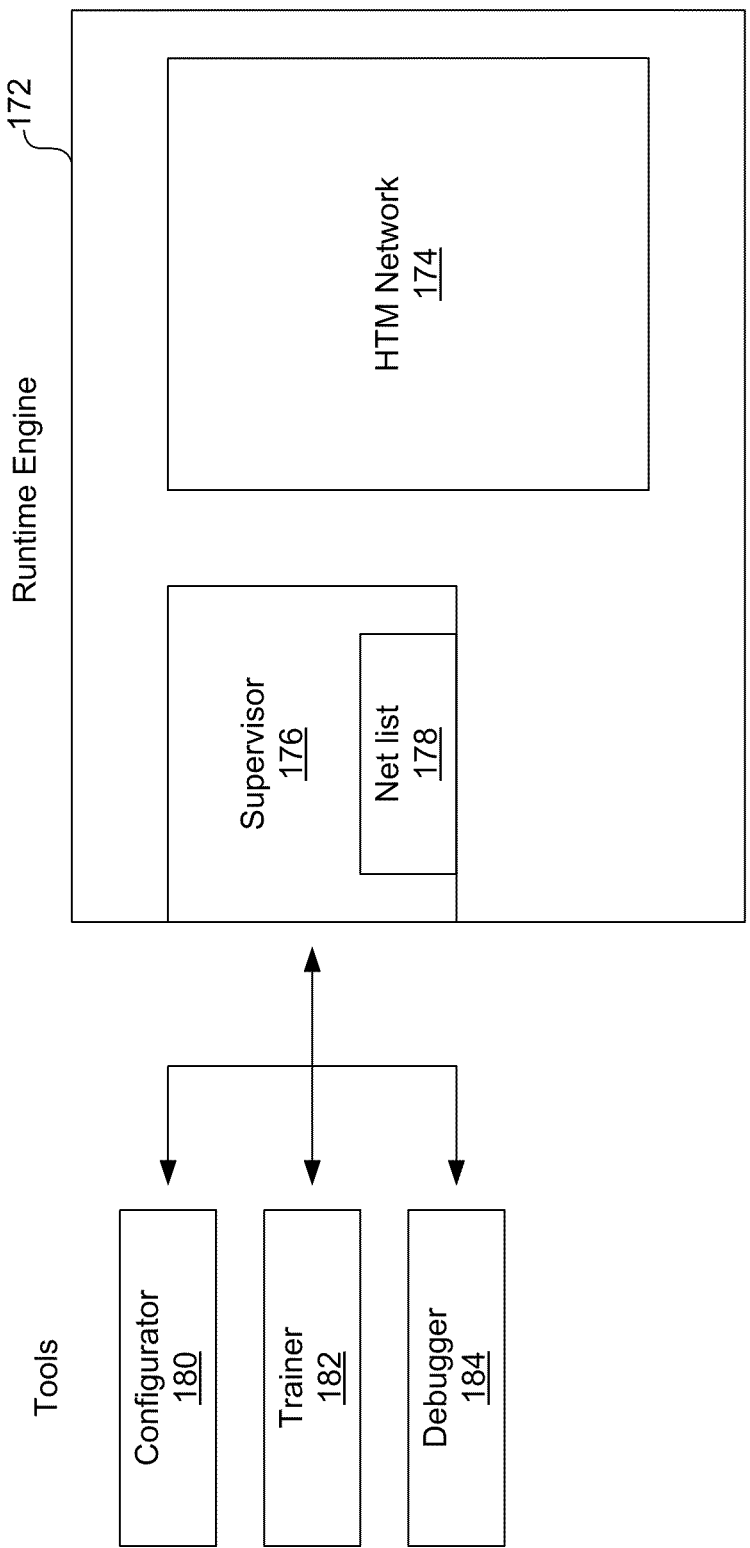
FIG. 17 shows at least a portion of a HTM-based system in accordance with an embodiment of the present invention.

As shown in FIG. 17, the Supervisor entity 176 is associated with a net list 178. The Supervisor entity 176 uses a description in the net list 178 to configure the HTM network 174. For example, a description in the net list 178 may specify the distribution of nodes across a given set of CPUs. However, in one or more other embodiments of the present invention, the Supervisor entity 176 may configure an HTM network dynamically if, for example, certain information is not contained in the net list 178. Further, in one or more embodiments of the present invention, the Supervisor entity 176 may read a net list from a date file. Further, in one or more embodiments of the present invention, a net list may be specified interactively by a user using one or more tools 180, 182, 184.

Further, in one or more embodiments of the present invention, the Supervisor entity 176 may perform global network actions, distribute nodes across CPUs, and/or coordinate CPU activity/behavior. Further, in one or more embodiments of the present invention, the Supervisor entity 176 may enforce licensing restrictions such as those relating to, for example, the number of usable CPUs, license expiration dates, number of user limitations, and/or the ability to load third-party "plug-ins."

Further, in one or more embodiments of the present invention, the Supervisor entity 176 may check for software updates on some regular basis. In such embodiments, if there is a software update available, the Supervisor entity 176 may, for example, install the software update and restart the HTM network 174. Further, in one or more embodiments of the present invention, the Supervisor entity 176 may determine and/or select the order in which portions of the HTM network 174 are to be updated.

Further, in one or more embodiments of the present invention, the Supervisor entity 176 may communicate with one or more CPUs (not shown in FIG. 15) running the HTM network 174 using, for example, a private or internal application program interface (API). Further, in one or more embodiments of the present invention, the Supervisor entity 176 and the one or more CPUs (not shown in FIG. 15) running the HTM network 174 may all be on the same local area network (LAN).

Further, in one or more embodiments of the present invention, the Supervisor entity 176 may run on a CPU separate from one or more CPUs (not shown in FIG. 15) running the HTM network 174. However, in one or more other embodiments of the present invention, the Supervisor entity 176 may run on a CPU that runs all or part of the HTM network 174.

Figure 18:
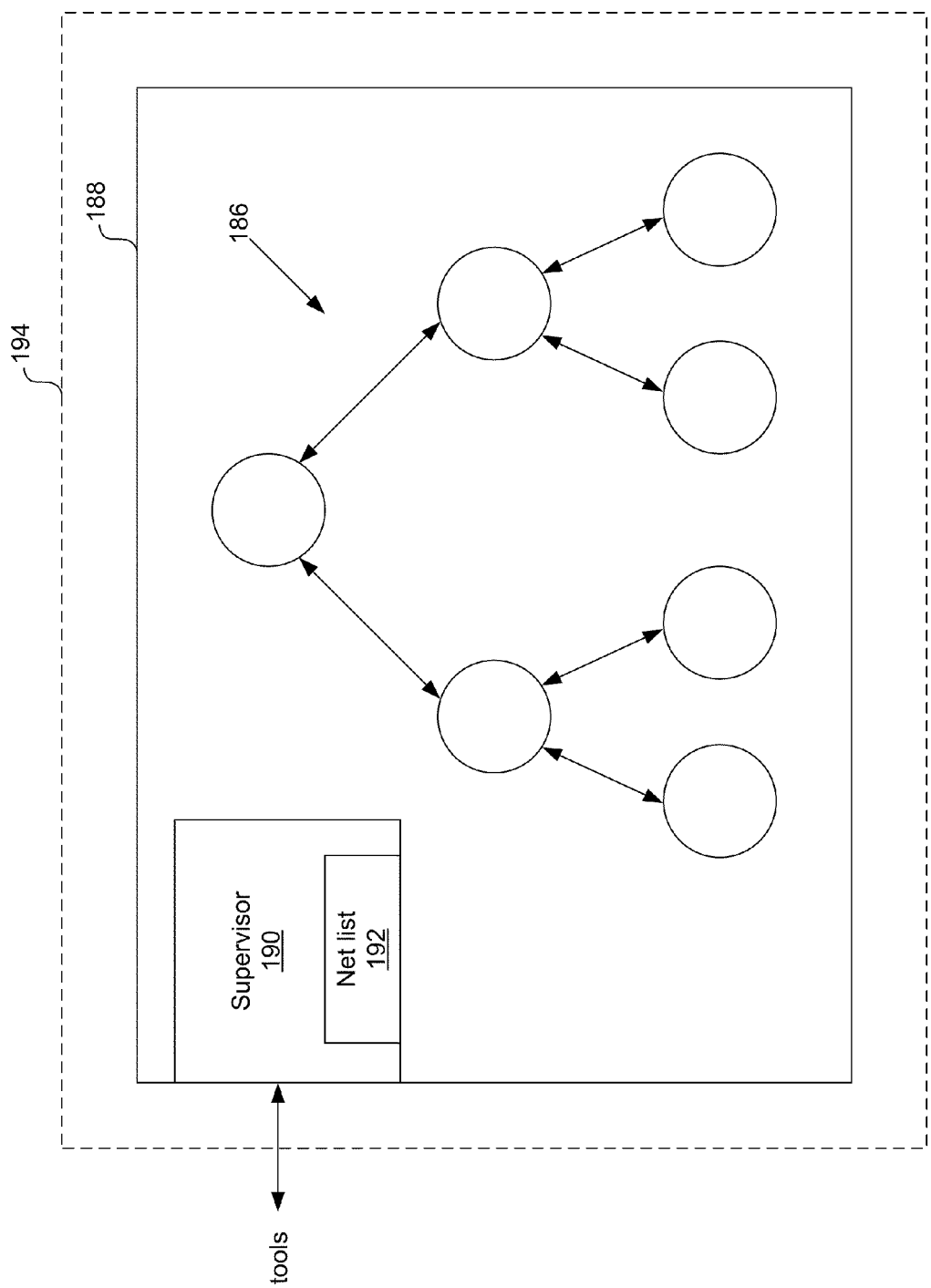
FIG. 18 shows at least a portion of a HTM-based system in accordance with an embodiment of the present invention.

FIG. 18 shows at least a portion of an HTM-based system that runs an HTM network 186 on a single CPU 188. In such embodiments of the present invention, an instance of Supervisor entity 190, along with a net list 192, may run on CPU 188. Further, as shown in FIG. 19, a runtime engine 194 may be composed of the software executables for the HTM network 186, the Supervisor entity 190, and the net list 192.

Figure 19:
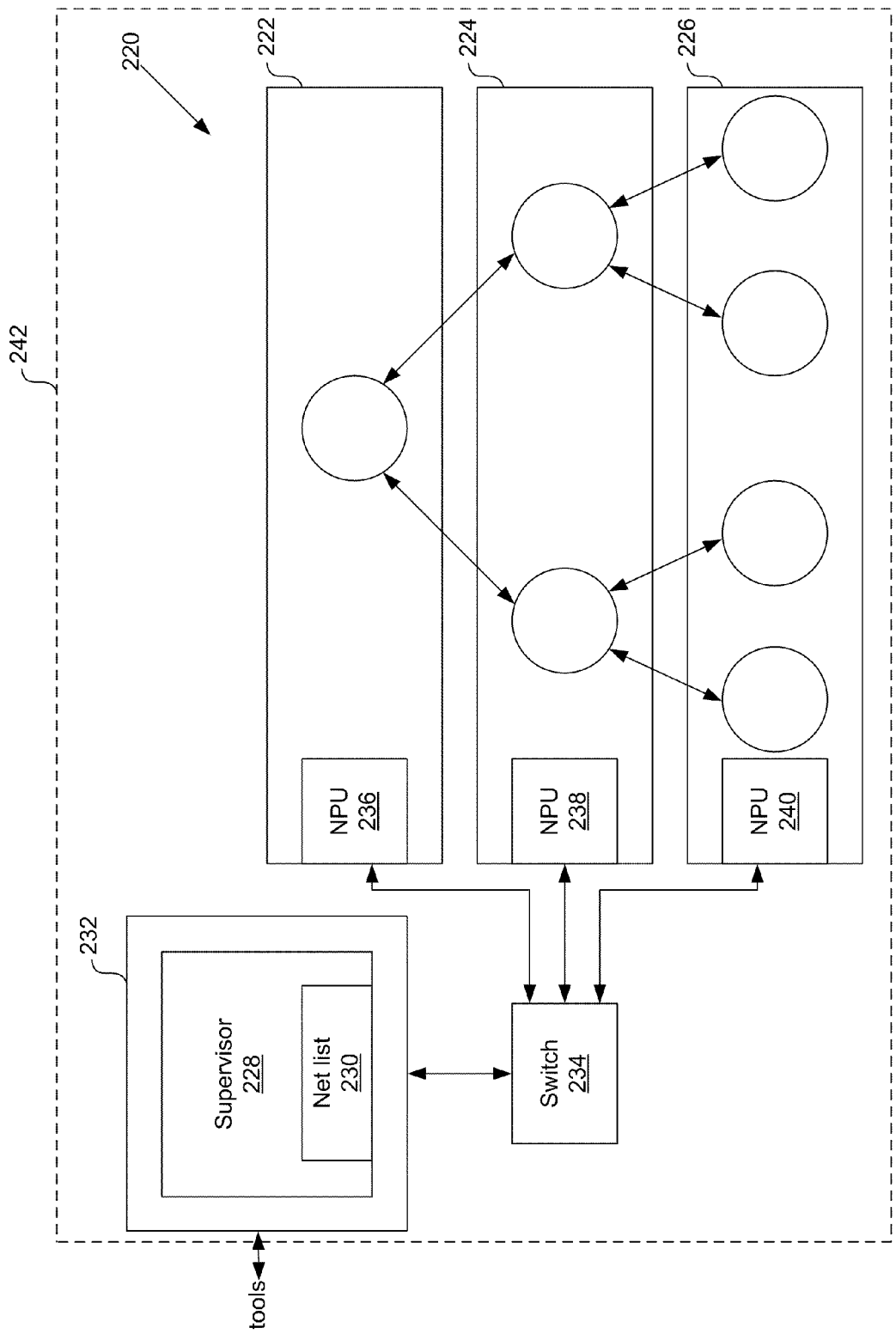
FIG. 19 shows at least a portion of a HTM-based system in accordance with an embodiment of the present invention.

FIG. 19 shows at least a portion of an HTM-based system that runs an HTM network 220 on multiple CPUs 222, 224, 226. The CPUs 222, 224, 226 may all be part of the same server (thereby, sharing resources of that server) or they may be distributed over two or more servers. An instance of Supervisor entity 228, along with a net list 230, may run on a separate CPU 232. In such embodiments of the present invention, the Supervisor entity 228 may communicate (across, for example, a switch 234) with instances of "node processing units" (NPUs) 236, 238, 240 running on each of the CPUs 222, 224, 226. Each NPU 236, 238, 240 may be a software component that is responsible for running and/or scheduling a portion (i.e., a "sub-net") of the HTM network 220 running on the CPU 222, 224, 226 to which the NPU 236, 238, 240 is respectively allocated. At an initial stage, each NPU 236, 238, 240 may receive information from the Supervisor entity 228 describing all or part of the HTM network 220, including information relating to the portion of the HTM network 220 that each NPU 236, 238, 240 will manage. Further, each NPU 236, 238, 240 may be responsible for allocating the memory needed for the nodes, links, and other data structures for the portion of the HTM network 220 for which it is responsible.

Further, each NPU 236, 238, 240 may run and/or schedule a portion of the HTM network 220 in some timing relation to at least one other NPU 236, 238, 240.

Further, in one or more embodiments of the present invention, each NPU 236, 238, 240 may maintain a local net list. A local net list may be used by an NPU to determine when to update one or more nodes, where "updating" a node may include executing an operation of the node and then updating the state of the node. An NPU may perform such updating based on, for example, one or more timestamps of previous updates of one or more nodes, one or more values (e.g., beliefs) of one or more nodes, priorities of one or more nodes, and/or a set of rules for updating nodes.

Further, as shown in FIG. 19, a runtime engine 242 may be composed of the software executables for the HTM network 220, the Supervisor entity 228, the net list 230, and the NPUs 236, 238, 240. Moreover, a file server (not shown) may be present to store file information for one or more of the various components shown in FIG. 19.

Further, as shown, for example, in FIG. 19, there is one NPU per CPU running a portion of an HTM network. However, in one or more other embodiments of the present invention, there may be a different relationship as to the number of NPUs allocated per CPU.

As described above with reference to FIG. 17 (also shown in FIGS. 18 and 19), a runtime engine 1720 running HTM network 174 may interface with one or more tools 180, 182, 184. Each of these tools 180, 182, 184 may be used by a user (e.g., a software developer) to, for example, modify, improve, augment, restrict, configure, or otherwise affect an operation or configuration of the HTM network 174 or a CPU on which the HTM network 174 runs. Generally, in one or more embodiments of the present invention, Configurator tool 180 may be used to create and/or configure an HTM network, Trainer tool 182 may be used to create a trained HTM network for a particular application, and/or Debugger tool 184 may be used to debug the operation of an HTM network. Further, in one or more embodiments of the present invention, tools (not shown) may be provided to, for example, monitor/report performance of an HTM network and/or deploy a designed, trained, and/or debugged HTM network as a running application. In general, one or more embodiments of the present invention may use any number and/or types of different tools to interface with an HTM network.

In one or more embodiments of the present invention, a Supervisor entity (e.g., 176 in FIG. 18, 190 in FIG. 29, 228 in FIG. 20) may communicate with developer/client tools (e.g., 180, 182, 184 in FIG. 17) using a designated Supervisor API. In one or more embodiments of the present invention, the Supervisor API may support Unicode and/or multi-byte character sets.

Because the developer/client tools may reside at, or otherwise be accessible from, locations remote from a location running a particular HTM network, a Supervisor API may be accessible through, for example, a firewall. One protocol that may be used to facilitate such accessibility involves encoding messages in Extensible Markup Language (XML) and passing them over the Internet (i.e., HTTP transmission). If security is desired or required, then messages may be passed over a secure Internet protocol (e.g., HTTPS transmission). Further, in one or more embodiments of the present invention, if a Supervisor entity (e.g., 176 in FIG. 15, 190 in FIG. 16, 228 in FIG. 17) and developer/client tools (e.g., 180, 182, 184 in FIG. 15) are on the same LAN, messages may be passed using means such as, for example, socket connections and/or pipes.

As described above, a Supervisor API may interact with developer/client tools. In one or more embodiments of the present invention, the Supervisor API may be used to authenticate one or more client applications attempting to communicate with a Supervisor entity (e.g., 176 in FIG. 15, 190 in FIG. 16, 228 in FIG. 17). If the client is authenticated, the Supervisor API may return session information to the client and connect the client with the Supervisor entity. The Supervisor API may also disconnect the client from the Supervisor entity.

Further, in one or more embodiments of the present invention, a net list describing all or part of an HTM network may be passed from a client to a Supervisor entity through a Supervisor API. Further, a Supervisor API may be used to return state information to the client. State information may include, for example, the beliefs at one or more nodes of the HTM network, whether the HTM network is running, paused, or restarting, the number of nodes in all or part of the HTM network, and the number of CPUs actively running portions of the HTM network. Further, a Supervisor API may be accessed to start, pause and restart, or stop an HTM network.

Further, in one or more embodiments of the present invention, a Supervisor API may be accessed to: return a list of network files that have been stored by a system (e.g., a cluster of servers) used to run an HTM network; load an HTM network from a network file stored locally in a system (e.g., a cluster of servers) usable to rim an HTM network; locally save a state of an HTM network in a system (e.g., a cluster of servers) running the HTM network; move one or more nodes from running on one CPU to running on another CPU; turn a debugging feature "on" or "off"; retrieve detailed state information of a component in an HTM network; set a state of a component in an HTM network; instruct an HTM network to pause operations after a specific triggering event, where the triggering event may be completion of one complete iteration of the HTM network, completion of updating a given list of nodes, completion of updating one node on each CPU, reaching a particular time, reaching a particular node value, and/or an occurrence of an error; retrieve statistics regarding operation of an HTM network; request storage of historical data regarding an HTM network; retrieve stored historical data regarding an HTM network; retrieve messages from an event log that, for example, occurred during a particular time frame; execute an OS command; reboot a set of servers used to run an HTM network; and/or request the triggering of an alarm if certain conditions are met.

Further, in one or more embodiments of the present invention, a Supervisory API may have a "batch command" system. In one or more embodiments of the present invention, a batch command system may be used to execute one or more operations of a Supervisor API in a particular sequence. Further, in one or more embodiments of the present invention, a batch command system may be used to execute one or more of the same commands on more than one node. Further, in one or more embodiments of the present invention, a batch command system may include the capabilities of a full scripting language (e.g., Python, Perl) so that, for example, 'if' statements and loops may be performed easily. Note that the use of a full scripting language may allow a user to script complex commands (e.g., commands: train level 1 of hierarchy until states of level 1 nodes reach a given condition; then turn "off" learning in level 1 and train level 2 of hierarchy until states of level 2 nodes reach a given condition, etc.).

Further, in one or more embodiments of the present invention, the Supervisor API may be arranged to handle a failure of any of the hardware components needed to run a particular HTM network. Further, in one or more embodiments of the present invention, the Supervisor API may handle a software failure (e.g., failure of an NPU instance). Further, in one or more embodiments of the present invention, the Supervisor API may handle a communication establishment error. Further, in one or more embodiments of the present invention, the Supervisor API may handle one or more errors in reading a provided net list describing a particular HTM network.

In addition to the Supervisor API, an HTM-based system may also have a Node Plug-in API 250 as shown in FIG. 18. In FIG. 18 (elements labeled similarly to that shown in FIG. 19), the Node Plug-in API 250 may be used to create new node types. For example, the Node Plug-in API 250 may be used to interface new hardware for running the HTM network 186 and/or implement, for example, new learning algorithms. In one or more embodiments of the present invention, using the Node Plug-in API 250, one or more "plug-ins" may be dynamically loaded when the HTM network 186 is initialized or rebooted. In such a manner, a functionality of a runtime engine running the HTM network 186 may be extended as further described below.

While the invention has been described with respect to a limited number of embodiments, those skilled in the art, having benefit of the above description, will appreciate that other embodiments can be devised which do not depart from the scope of the invention as disclosed herein. Accordingly, the scope of the invention should be limited only by the attached claims.

What is claimed is:

1. A processing node in a computing device, comprising:
a processor; and
a spatial pooler configured to:
    detect spatial patterns in an input signal, the spatial patterns in the input signal changing over time; and
    generate a series of spatial pooler outputs in sparse distributed code, each spatial pooler output indicating the detected spatial patterns at a time; and
a temporal pooler configured to:
    associate temporal sequences of the detected spatial patterns by storing temporal relationships between the series of spatial pooler outputs; and
    generate a temporal pooler output based on the stored temporal relationships between the series of spatial pooler outputs.

2. The processing node of claim 1, wherein the spatial pooler output comprises a set of probabilities associated with a set of spatial patterns to indicate likelihood that the detected spatial patterns are associated with different causes.

3. The processing node of claim 1, wherein the spatial pooler is further configured to:
store spatial co-occurrence patterns, each representing a set of spatial patterns; and
compare the detected spatial patterns with the stored spatial co-occurrence patterns to generate the series of spatial pooler outputs.

4. The processing node of claim 3, wherein the spatial pooler is configured to compare the detected spatial patterns with the stored spatial co-occurrence patterns using Euclidean distance metric.

5. The processing node of claim 1, wherein the temporal pooler output comprises a set of probabilities indicating likelihood that the detected spatial patterns are associated with different temporal groups, each temporal group including a sequence of spatial patterns.

6. The processing node of claim 1, wherein the spatial pooler is configured to apply Hebbian learning algorithm to generate the series of spatial pooler outputs.

7. The processing node of claim 1, wherein the temporal pooler is further configured to send the temporal pooler output to another processing node.

8. The processing node of claim 1, wherein the temporal pooler is further configured to:
collect statistics of relationships between the spatial patterns detected at the spatial pooler, wherein the statistics include temporal proximity between the detected spatial patterns; and
build groups of the detected spatial patterns based on the statistics of the relationships.

9. The processing node of claim 8, wherein the statistics of relationships are stored in a matrix.

10. A method of detecting and processing sequences of spatial patterns in an input, comprising:
at a spatial pooler of a processing node, detecting spatial patterns in an input signal, the spatial patterns in the input signal changing over time;
at the spatial pooler, generating a series of spatial pooler outputs in sparse distributed code, each spatial pooler output indicating the detected spatial patterns at a time;
at a temporal pooler of the processing node, associating temporal sequences of the detected spatial patterns by storing temporal relationships between the series of spatial pooler outputs; and
at the temporal pooler, generating a sequence processor output based on the stored temporal relationships between the series of spatial pooler outputs.

11. The method of claim 10, wherein the spatial pooler output comprises a set of probabilities associated with a set of spatial patterns to indicate likelihood that the detected spatial patterns are associated with different causes.

12. The method of claim 10, further comprising:
at the spatial pooler, storing spatial co-occurrence patterns, each representing a set of spatial patterns; and
at the spatial pooler, comparing the detected spatial patterns with the stored spatial co-occurrence patterns to generate the series of spatial pooler outputs.

13. The method of claim 10, wherein comparing the detected spatial patterns comprises using Euclidean distance metric.

14. The method of claim 10, wherein the temporal pooler output comprises a set of probabilities indicating likelihood that the detected spatial patterns are associated with different temporal groups, each temporal group including a sequence of spatial patterns.

15. The method of claim 10, further comprising applying Hebbian learning algorithm to generate the series of spatial pooler outputs.

16. The method of claim 10, further comprising sending the temporal pooler output to another processing node.

17. The method of claim 10, further comprising:
at the temporal pooler, collecting statistics of relationships between the spatial patterns detected at the spatial pooler, wherein the statistics include temporal proximity between the detected spatial patterns; and
at the temporal pooler, building groups of the detected spatial patterns based on the statistics of the relationships.

18. The method of claim 10, further comprising storing the statistics of relationships in a matrix.

19. A non-transitory computer readable storage medium structured to store instructions executable by a processor in a computing device, the instructions, when executed cause the processor to:
detect spatial patterns in an input signal, the spatial patterns in the input signal changing over time;
generate a series of spatial pooler outputs in sparse distributed code, each spatial pooler output indicating the detected spatial patterns at a time;

associate temporal sequences of the detected spatial patterns by storing temporal relationships between the series of spatial pooler outputs; and generate a sequence processor output based on the stored temporal relationships between the series of spatial pooler outputs.

20. The computer readable storage medium of claim 19, wherein the spatial pooler output comprises a set of probabilities associated with a set of spatial patterns to indicate likelihood that the detected spatial patterns are associated with different causes.

* * * * *